US009215677B2

(12) United States Patent
Uemura et al.

(10) Patent No.: US 9,215,677 B2
(45) Date of Patent: Dec. 15, 2015

(54) TERMINAL APPARATUS, BASE-STATION APPARATUS, COMMUNICATION SYSTEM, METHOD FOR CONTROLLING TRANSMISSION OF TERMINAL APPARATUS, METHOD FOR CONTROLLING TRANSMISSION OF BASE-STATION APPARATUS, INTEGRATED CIRCUIT INSTALLED IN TERMINAL APPARATUS, AND INTEGRATED CIRCUIT INSTALLED IN BASE-STATION APPARATUS

(71) Applicant: Sharp Kabushiki Kaisha, Osaka-shi, Osaka (JP)

(72) Inventors: Katsunari Uemura, Osaka (JP); Yasuyuki Kato, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 14/368,362

(22) PCT Filed: Dec. 14, 2012

(86) PCT No.: PCT/JP2012/082446
§ 371 (c)(1),
(2) Date: Jun. 24, 2014

(87) PCT Pub. No.: WO2013/099649
PCT Pub. Date: Jul. 4, 2013

(65) Prior Publication Data
US 2015/0011215 A1 Jan. 8, 2015

(30) Foreign Application Priority Data

Dec. 26, 2011 (JP) ................................ 2011-282614

(51) Int. Cl.
*H04W 36/16* (2009.01)
*H04W 56/00* (2009.01)
(Continued)

(52) U.S. Cl.
CPC ............. *H04W 56/0005* (2013.01); *H04L 5/00* (2013.01); *H04W 36/34* (2013.01); *H04W 72/042* (2013.01)

(58) Field of Classification Search
CPC ...................................................... H04W 36/16
USPC ......................................................... 455/436
See application file for complete search history.

(56) References Cited

U.S. PATENT DOCUMENTS

2011/0092195 A1* 4/2011 Hussein et al. ............... 455/418
2012/0044812 A1* 2/2012 Hiddink et al. ............... 370/241
(Continued)

OTHER PUBLICATIONS

Official Communication issued in International Patent Application No. PCT/JP2012/082446, mailed on Jan. 29, 2013.
(Continued)

*Primary Examiner* — Christopher M Brandt
(74) *Attorney, Agent, or Firm* — Keating & Bennett, LLP

(57) ABSTRACT

Provided is a terminal apparatus (1) that is connected to a base-station apparatus (2) by aggregating a plurality of cells. The terminal apparatus groups cells of different frequencies on the basis of a configuration of a transmission timing group which is notified from the base-station apparatus (2), configures a timing reference cell that is used as a reference of an uplink transmission timing of the cells in the group, a group identifier that identifies the group, and a transmission timing timer that indicates available time of the uplink transmission timing of the cells in the group for each group, and releases the configuration of the transmission timing group corresponding to the group in a case where the timing reference cell does not exist in the group due to a modification in a cell on the basis of a modification instruction message which is transmitted from the base-station apparatus (2) and which gives an instruction of changing the cells in the group.

8 Claims, 16 Drawing Sheets

(51) Int. Cl.
*H04W 72/04* (2009.01)
*H04W 36/34* (2009.01)
*H04L 5/00* (2006.01)

(56) References Cited

U.S. PATENT DOCUMENTS

| | | | |
|---|---|---|---|
| 2012/0140743 A1* | 6/2012 | Pelletier et al. | 370/335 |
| 2012/0282942 A1* | 11/2012 | Uusitalo et al. | 455/452.2 |
| 2013/0028204 A1* | 1/2013 | Dinan | 370/329 |
| 2015/0011197 A1* | 1/2015 | Tarraf et al. | 455/418 |

OTHER PUBLICATIONS

NTT DOCOMO, Inc. "CA support for multi-TA", 3GPP TSG-RAN2#69, R2-101567, San Francisco, CA, Feb. 22-26, 2010, pp. 1-12.

Nokia Siemens Networks, et al., "Timing and Pathloss reference", 3GPP TSG-RAN WG2 Meeting #76, R2-115803, San Francisco, CA, Nov. 14-18, 2011, 3 pages.

HT mMobile Inc., "TA group change for SCell", 3GPP TSG RAN WG2 #75bis, R2-115199, Zhuhai, CN, Oct. 10-14, 2011, 4 pages.

Renesas Mobile Europe, "Discussion on TAT and TAG Handling", 3GPP TSG-RAN WG2 Meeting #76, R2-115783, Nov. 14-18, 2011, 3 pages.

Huawei et al., "Signalling for the TA Group Management", 3GPP TSG-RAN WG2 Meeting #76, R2-115827, Nov. 14-18, 2011, 4 pages.

Catt, "Signaling for TAG Configuration", 3GPP TSG-RAN WG2 Meeting #76, R2-115791, Nov. 14-18, 2011, pp. 1-4.

Alcatel-Lucent et al., "TA Group Management", TSG-RAN WG2 Meeting #76, R2-116181, Nov. 14-18, 2011, 4 pages.

Pantech, "Reference for Timing and Path Loss with TAG Management", 3GPP TSG-RAN WG2 Meeting #76, R2-116045, Nov. 14-18, 2011, pp. 1-2.

* cited by examiner

TERMINAL APPARATUS, BASE-STATION APPARATUS, COMMUNICATION SYSTEM, METHOD FOR CONTROLLING TRANSMISSION OF TERMINAL APPARATUS, METHOD FOR CONTROLLING TRANSMISSION OF BASE-STATION APPARATUS, INTEGRATED CIRCUIT INSTALLED IN TERMINAL APPARATUS, AND INTEGRATED CIRCUIT INSTALLED IN BASE-STATION APPARATUS

TECHNICAL FIELD

An embodiment of the invention relates to a technique of effectively controlling uplink transmission timing for each of respective uplink transmission timing groups of a mobile-station apparatus in a case where the mobile-station apparatus supports transmission at a plurality of uplink transmission timings.

BACKGROUND ART

In 3GPP ($3^{rd}$ Generation Partnership Project) that is a standardization project, standardization of an OFDM (Orthogonal Frequency-Division Multiplexing) communication mode, or Evolved Universal Terrestrial Radio Access (hereinafter, referred to as "EUTRA") that realizes high-speed communication by employing flexible scheduling at a predetermined frequency unit and time unit called a resource block has been carried out.

In addition, in the 3GPP, advanced EUTRA which realizes further high-speed data transmission and has upper compatibility with EUTRA has been discussed. As a technique in advanced EUTRA, carrier aggregation (CA) has been suggested. The carrier aggregation is a technique of improving a transmission rate by using a plurality of different frequencies (component carriers, also referred to as CC) in an aggregated manner. In addition, there is suggested a technique in which a mobile-station apparatus in communication with a base-station apparatus by using the carrier aggregation has a plurality of uplink transmission timings (Timing Advance; TA) for each frequency or component carrier (NPL 1).

In EUTRA, a random access procedure is prepared to adjust the uplink transmission timing of the mobile-station apparatus. With regard to the random access procedure, a method, in which the base-station apparatus configures information indicating initiation of the random access procedure to a physical downlink control channel and transmits the information in order for a specific mobile-station apparatus to initiate the random access procedure, may be exemplified in addition to a method in which the mobile-station apparatus autonomously determines necessity of the random access procedure and initiates the random access procedure.

In addition, in the 3GPP, in a case where the mobile-station apparatus in communication with the base-station apparatus by using the carrier aggregation needs a different uplink transmission timing for each frequency or a plurality of frequencies (component carriers), there are suggested that frequencies (component carriers) of the same uplink transmission timing are grouped, and a timer (transmission timing timer, Timing Alignment Timer; TAT) that manages a state of the uplink transmission timing is provided for each group, or that one reference cell that is used as a reference of the uplink transmission timing is provided for each group (NPL 2). In addition, a group in which the uplink transmission timings indicate the same frequency (component carrier) is also referred to as a transmission timing group (Timing Alignment Group; TAG).

In 3GPP, there is also suggested that a group, to which the frequency (component carrier) of the mobile-station apparatus in communication with the base-station apparatus by using the carrier aggregation belongs, can be changed to another group for each frequency (component carrier) by instruction from the base-station apparatus (NPL 3).

In addition, the base-station apparatus constitutes one cell by combining one downlink component carrier and one uplink component carrier. In addition, the base-station apparatus may constitute one cell by only one downlink component carrier.

CITATION LIST

Non Patent Literature

NPL 1: R2-101567, NTT DOCOMO, 3GPP TSG-RAN WG2#69, 22-26 Feb. 2010, San Francisco, USA NPL 2: R2-115803, Nokia Siemens Networks, Nokia Corporation, 3GPP TSG-RAN WG2#76, 14-18 Nov. 2011, San Francisco, USA NPL 3: R2-115199, HT mMobile Inc., 3GPP TSG-RAN WG2#75 bis, 10-14 Oct. 2011, Zhuhai, China

SUMMARY OF INVENTION

Technical Problem

However, as disclosed in NPL 3, in the method of modification of the group of the transmission timing of the uplink, to which the cell in communication belongs, by an instruction of the base-station apparatus only discloses a method of only modification of the group while retaining the cell. However, in a case where the reference cell that is used as a reference of the uplink transmission timing is changed by modification of a serving cell configuration such as modification of the cell by hand-over, a reference cell for a transmission timing of an uplink of a referenced cell that belongs to the same group is not present, and thus the transmission timing becomes indefinite.

In addition, there is no determination of how to reconfigure the transmission timing timer for each transmission timing group. This means that a radio resource, which cannot be practically used for the mobile-station apparatus, is configured. Therefore, management of the radio resource regarding uplink transmission control in a communication system becomes inefficient, and thus there is a problem in that usage efficiency of the radio resources decreases.

In consideration of the above-described problems, an object of embodiments of the invention is to provide a technique of efficiently controlling uplink transmission timings for each of the uplink transmission timing groups in a case where a mobile-station apparatus supports transmission at a plurality of uplink transmission timings.

Solution to Problem

To accomplish the above-described object, the following means has been developed. That is, according to an embodiment of the invention, there is provided a terminal apparatus that is connected to a base-station apparatus by aggregating a plurality cells. In the terminal apparatus, cells of different frequencies are grouped on the basis of a configuration of a transmission timing group which is notified from the base-station apparatus, a timing reference cell that is used as a reference of an uplink transmission timing of the cells in the group, a group identifier that identifies the group, and a transmission timing timer that indicates available time of the uplink transmission timing of the cells in the group are configured for each group, and in a case where the timing reference cell does not exist in the group due to a change in a cell on the basis of a modification instruction message which is transmitted from the base-station apparatus and which gives an instruction of modification of the cells in the group, the configuration of the transmission timing group corresponding to the group is released.

In addition, according to another embodiment of the invention, there is provided a base-station apparatus that is connected to a terminal apparatus by aggregating a plurality of cells. In the base-station apparatus, an instruction of grouping cells of different frequencies is given to the terminal apparatus, a configuration of a transmission timing group, which includes a timing reference cell that is used as a reference of an uplink transmission timing of the cells in the group, a group identifier that identifies the group, and a transmission timing timer that indicates available time of the uplink transmission timing of the cells in the group, is configured for each group, and in a case where the terminal apparatus changes a cell on the basis of a modification instruction message which gives an instruction of modification of the cells in the group and thus the timing reference cell does not exist in the group, the configuration of the transmission timing group corresponding to the group is released.

In addition, according to still another embodiment of the invention, there is provided a communication system in which a base-station apparatus and a terminal apparatus are connected to each other by aggregating a plurality of cells, the base-station apparatus gives an instruction for the terminal apparatus to group cells of different frequencies, configures a configuration of a transmission timing group, which includes a timing reference cell that is used as a reference of an uplink transmission timing of the cells in the group, a group identifier that identifies the group, and a transmission timing timer that indicates available time of the uplink transmission timing of the cells in the group, for each group, and transmits a modification instruction message, which gives an instruction of modification of the cells in the group, to the terminal apparatus, and in a case where the timing reference cell does not exist in the group due to a modification of a cell on the basis of the modification instruction message which is transmitted from the base-station apparatus, the terminal apparatus releases the configuration of the transmission timing group corresponding to the group.

In addition, according to still another embodiment of the invention, there is provided a method for controlling transmission of a terminal apparatus that is connected to a base-station apparatus by aggregating a plurality of cells. The method includes: a step of grouping cells of different frequencies on the basis of a configuration of a transmission timing group which is notified from the base-station apparatus; a step of configuring a timing reference cell that is used as a reference of an uplink transmission timing of the cells in the group, a group identifier that identifies the group, and a transmission timing timer that indicates available time of the uplink transmission timing of the cells in the group for each group; and a step of releasing the configuration of the transmission timing group corresponding to the group in a case where the timing reference cell does not exist in the group due to a change in a cell on the basis of a modification instruction message which is transmitted from the base-station apparatus and which gives an instruction of modification of the cells in the group.

In addition, according to still another embodiment of the invention, there is provided a method for controlling transmission of a base-station apparatus that is connected to a terminal apparatus by aggregating a plurality of cells. The method includes: a step of giving an instruction for the terminal apparatus to group cells of different frequencies; a step of configuring a configuration of a transmission timing group, which includes a timing reference cell that is used as a reference of an uplink transmission timing of the cells in the group, a group identifier that identifies the group, and a transmission timing timer that indicates available time of the uplink transmission timing of the cells in the group, for each group; and a step of releasing the configuration of the transmission timing group corresponding to the group in a case where the terminal apparatus changes a cell on the basis of a modification instruction message which gives an instruction of modification of the cells in the group, and thus the timing reference cell does not exist in the group.

In addition, according to still another embodiment of the invention, there is provided an integrated circuit that is installed in a terminal apparatus configured to be connected to a base-station apparatus by aggregating a plurality of cells. The integrated circuit executes: a function of grouping cells of different frequencies on the basis of a configuration of a transmission timing group which is notified from the base-station apparatus; a function of configuring a timing reference cell that is used as a reference of an uplink transmission timing of the cells in the group, a group identifier that identifies the group, and a transmission timing timer that indicates available time of the uplink transmission timing of the cells in the group for each group; and a function of releasing the configuration of the transmission timing group corresponding to the group in a case where the timing reference cell does not exist in the group due to a change in a cell on the basis of a modification instruction message which is transmitted from the base-station apparatus and which gives an instruction of modification of the cells in the group.

In addition, according to still another embodiment of the invention, there is provided an integrated circuit that is installed in a base-station apparatus configured to be connected to a terminal apparatus by aggregating a plurality of cells. The integrated circuit executes: a function of giving an instruction for the terminal apparatus to group cells of different frequencies; a function of configuring a configuration of a transmission timing group, which includes a timing reference cell that is used as a reference of an uplink transmission timing of the cells in the group, a group identifier that identifies the group, and a transmission timing timer that shows available time of the uplink transmission timing of the cells in the group, for each group; and a function of releasing the configuration of the transmission timing group corresponding to the group in a case where the terminal apparatus changes a cell on the basis of a modification instruction message which gives an instruction of modification of the cells in the group and thus the timing reference cell does not exist in the group.

In this specification, the respective embodiments are disclosed as a technical improvement in a case where the mobile-station apparatus and the base-station apparatus are connected to each other by using a plurality of serving cells of different frequencies. However, a communication mode, which is applicable to the respective embodiments, is not limited to a communication mode such as EUTRA and advanced EUTRA having upper compatibility with EUTRA.

For example, the technique described in this specification may be used in various communication systems such as a code division multiple access (CDMA) system, a time division multiple access (TDMA) system, a frequency division multiple access (FDMA) system, an orthogonal FDMA (OFDMA) system, a single carrier FDMA (SC-FDMA) system, and the other systems. In addition, in this specification, a system and a network may be used synonymously.

Advantageous Effects of Invention

As described above, according to the embodiments of the invention, in a case where the mobile-station apparatus, which is capable of being connected to the base-station apparatus by using a plurality of serving cells of different frequencies, supports transmission at a plurality of uplink transmission timings, it is possible to provide a technique of effectively controlling an uplink transmission timing for each of the uplink transmission timing groups.

DESCRIPTION OF EMBODIMENTS

Figure 1:
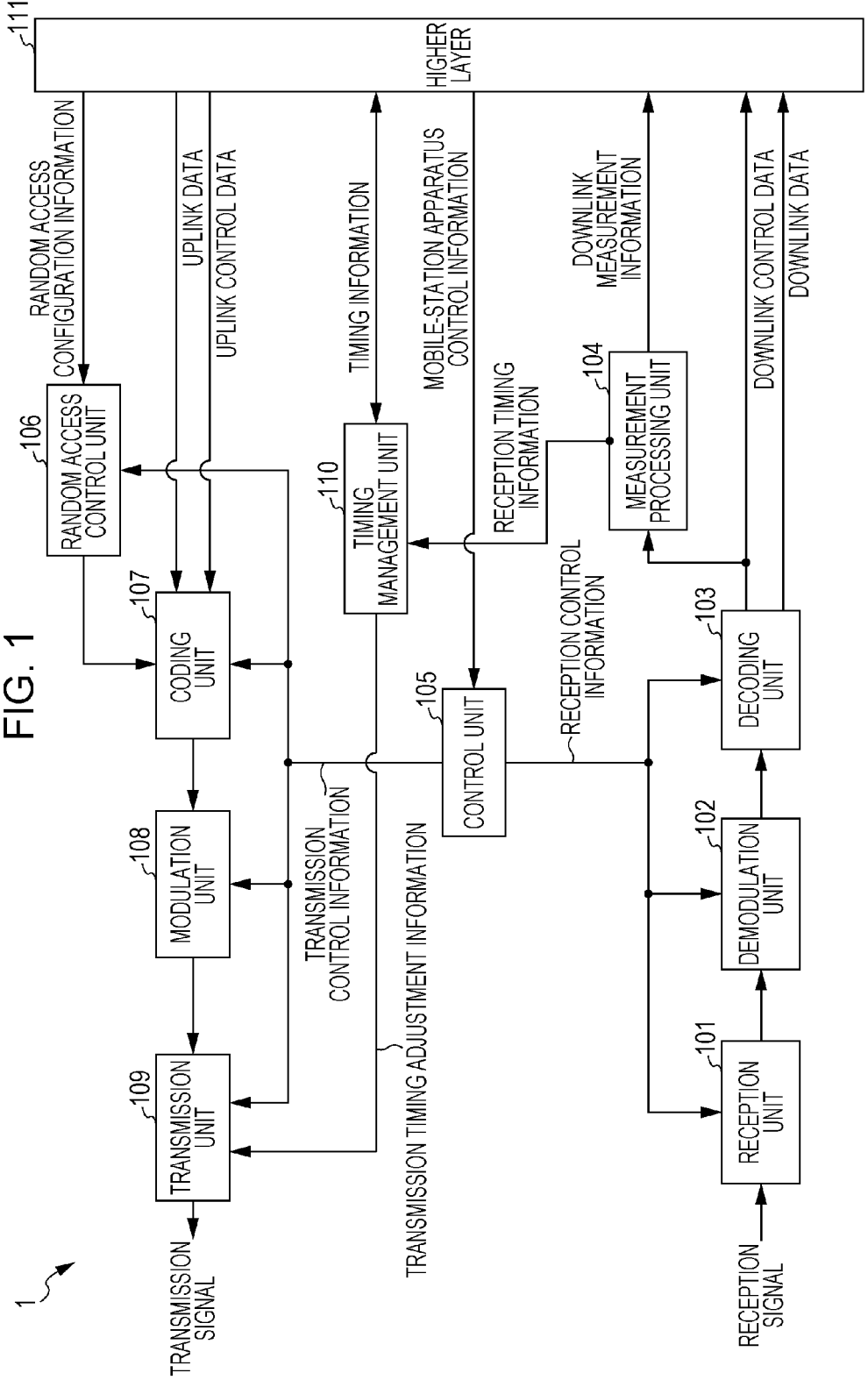
FIG. 1 is a block diagram illustrating a schematic configuration of a mobile-station apparatus in embodiments of the invention.

Prior to description of respective embodiments of the invention, a technique relating to the respective embodiments of the invention will be briefly described.

[Physical Channel]

A main physical channel (or physical signal) that is used in EUTRA and advanced EUTRA will be described. A channel indicates a medium that is used for transmission of signals, and the physical channel indicates a physical medium that is used for transmission of signals. There is a possibility that in EUTRA and advanced EUTRA, the physical channel may be added, or a structure or a format type of the physical channel may be changed or added in the future. However, even in the case of modification or addition, this case has no effect on a description of respective embodiments of the invention.

In EUTRA and advanced EUTRA, scheduling of the physical channel is managed by using a radio frame. One radio frame is 10 ms, and the one radio frame is constituted by 10 sub-frames. In addition, one sub-frame is constituted by two slots (that is, one slot is 0.5 ms). In addition, management is performed by using a resource block as the minimum unit of scheduling in which physical channels are mapped. The resource block is defined as a constant frequency domain in which a frequency axis is constituted by an assembly of a plurality of sub-carriers (for example, 12 sub-carriers) and a domain in which the frequency axis is constituted by a constant transmission time interval (one slot).

A synchronization signal is constituted by three kinds of primary synchronization signals, and a secondary synchronization signal constituted by 31 kinds of codes that are arranged alternately in a frequency domain. 504 kinds of cell identifiers (physical cell identity; PCI)) that identify a base-station apparatus, and a frame timing for radio synchronization are shown by a combination of signals of the primary synchronization signals and the secondary synchronization signal. A mobile-station apparatus specifies the cell ID of the synchronization signal that is received by cell search.

A physical broadcast information channel (PBCH; Physical Broadcast Channel) is transmitted to notify a control parameter (broadcast information (system information)) that is commonly used in mobile-station apparatuses in a cell. With regard to the broadcast information that is not notified by the physical broadcast information channel, a radio resource is notified by a physical downlink control channel, and is transmitted as a Layer 3 message (system information) by a physical downlink shared channel. As broadcast information, a cell global identifier (CGI) that indicates an individual cell identifier, a tracking area identifier (TAI) that manages a standby area according to paging, random access configuration information (transmission timing timer and the like), common radio resource configuration information, and the like are notified.

A downlink reference signal is divided into a plurality of types in accordance with a use thereof. For example, a cell-specific RS (reference signal) is a pilot signal that is transmitted for each cell with a predetermined power, and is a downlink reference signal that is periodically iterated in a frequency domain and a time region on the basis of a predetermined rule. The mobile-station apparatus measures a reception quality for each cell by receiving the cell-specific RS. In addition, the mobile-station apparatus uses a down cell-specific RS as a reference signal for demodulation of a physical downlink control channel or a physical downlink shared channel which is transmitted simultaneously with the cell-specific RS. As a sequence that is used in the cell-specific RS, a sequence, which can be identified for each cell, is used.

In addition, the downlink reference signal is also used to estimate a downlink channel variation. The downlink reference signal that is used to estimate the channel variation is referred to as a channel state information reference signal (CSI-RS). In addition, a downlink reference signal that is individually configured for each mobile-station apparatus is referred to as a UE specific reference signal (URS) or dedicated RS (DRS), and is used to demodulate the physical downlink control channel or the physical downlink shared channel.

The physical downlink control channel (PDCCH) is transmitted as several OFDM symbols from the beginning of each subframe, and is used to give an instruction about radio resource allocation information according to scheduling of the base-station apparatus and an adjustment amount of increase and decrease in transmission power to the mobile-station apparatus. It is necessary for the mobile-station apparatus to acquire radio resource allocation information such as an uplink grant during transmission and a downlink grant (downlink assignment) during reception from the physical downlink control channel by monitoring the physical downlink control channel addressed to the mobile-station apparatus before transmitting and receiving a Layer 3 message (paging, hand-over command, and the like) that is downlink data or downlink control data, and by receiving the physical downlink control channel addressed to the mobile-station apparatus. In addition, in addition to the transmission as the above-described ODFM symbols, the physical downlink control channel may be configured to be transmitted as a resource block region that can be dedicatedly allocated to the mobile-station apparatus from the base-station apparatus.

A physical uplink control channel (PUCCH) is used to give a reception confirmation response (ACK/NACK, Acknowledgement/Negative Acknowledgement) of data transmitted on the physical downlink shared channel, to give downlink channel (channel state) information (CSI), or to make a scheduling request (SR) that is a radio resource allocation request (radio resource request) of the uplink. CSI includes CQI (Channel Quality Indicator), PMI (Precoding Matrix Indicator), PTI (Precoding Type Indicator), and RI (Rank Indicator). Each indicator may be described as indications, but a use and meaning thereof are the same in each case.

A physical downlink shared channel (PDSCH) is also used to notify the mobile-station apparatus of paging or broadcast information (system information) that is not notified on physical broadcast information channel as a Layer 3 message in addition to the downlink data. Radio resource allocation information of the physical downlink shared channel is shown on the physical downlink control channel.

A physical uplink shared channel (PUSCH) mainly transmits uplink data and uplink control data, and may include a reception quality of the downlink or control data such as ACK/NACK. In addition, the physical uplink shared channel is also used to notify the base-station apparatus of uplink control information as a Layer 3 message in addition to the uplink data. In addition, as is the case with the downlink, radio resource allocation information of the physical uplink shared channel is shown on the physical downlink control channel.

An uplink reference signal (also, referred to as an uplink pilot signal or an uplink pilot channel) includes a demodulation reference signal (DMRS) that is used by the base-station apparatus to demodulate the physical uplink control channel PUSCH and/or the physical uplink shared channel PUSCH, and a sounding reference signal (SRS) that is used by the base-station apparatus to mainly estimate a channel state of the uplink. In addition, examples of the sounding reference signal include a periodic sounding reference signal (periodic SRS) and an aperiodic sounding reference signal (aperiodic SRS).

A physical random access channel (PRACH) is a channel that is used to give a notification of a preamble sequence and includes guard time. The preamble sequence is configured to express information of six bits by preparing 64 kinds of sequences. The physical random access channel is used as access means of the mobile-station apparatus to the base-station apparatus. The mobile-station apparatus uses the physical random access channel to request a radio source when the physical uplink control channel is not configured, or to make a request for the base-station apparatus to transmit transmission timing adjustment information (also, referred to as timing advance (TA)) necessary to align an uplink transmission timing to a reception timing window of the base-station apparatus.

Specifically, the mobile-station apparatus transmits the preamble sequence by a radio resource for the physical random access channel that is configured by the base-station apparatus. The mobile-station apparatus, which receives the transmission timing adjustment information, configures a transmission timing timer that counts available time of the transmission timing adjustment information that is commonly configured by broadcast information (or individually configured with a Layer 3 message), and manages an uplink state as a transmission timing adjustment state for available time (during counting) of the transmission timing timer, and as a transmission timing non-adjustment state (transmission timing non-adjustment state) during a period other than an available period (during stopping). The Layer 3 message is a message of a control plane which is interchanged between RRC (radio resource control) layers of the mobile-station apparatus and the base-station apparatus, and is used synonymously with an RRC signaling or an RRC message. In addition, the other physical channels are not involved with respective embodiments of the invention, and thus detailed description thereof will be omitted.

[Carrier Aggregation]

The carrier aggregation is a technique of dealing a plurality of frequencies (component carriers or frequency bands) of different frequency bands as one frequency (frequency band) by aggregating the frequencies. For example, in a case of aggregating five component carriers having a frequency bandwidth of 20 MHz by the carrier aggregation, a mobile-station apparatus having capability capable of performing the carrier aggregation performs an access by regarding these carriers to have one frequency bandwidth of 100 MHz. In addition, the component carriers that are aggregated may be contiguous frequencies or frequencies in which the entirety or parts of these are not contiguous. For example, in a case where frequency bands that can be used are a 800 MHz band, 2.4 GHz band, and 3.4 GHz band, an arbitrary component carrier may be transmitted in the 800 MHz band, another component carrier may be transmitted in the 2 GHz band, and still another component carrier may be transmitted in the 3.4 GHz band.

In addition, a plurality of contiguous or non-contiguous component carriers in the same frequency band, for example, in the 2.4 GHz band may be aggregated. The frequency bandwidth of each component carrier may be a frequency bandwidth narrower than 20 MHz, and respective frequency bandwidths may be different from each other. It is preferable that the frequency bandwidth be the same as any frequency bandwidth of a cell in the related art when considering backward compatibility. The base-station apparatus may increase or decrease the number of uplink or downlink component carriers allocated to the mobile-station apparatus on the basis of various factors such as an amount of staying data buffer, a reception quality of a cell which is reported from the mobile-station apparatus, a load in cells, and QoS. In addition, it is preferable that the number of uplink component carriers that are allocated (configured, added) to the mobile-station apparatus by the base-station apparatus be equal to or less than the number of downlink component carriers.

[Configuration of Communication Network]

Figure 14:
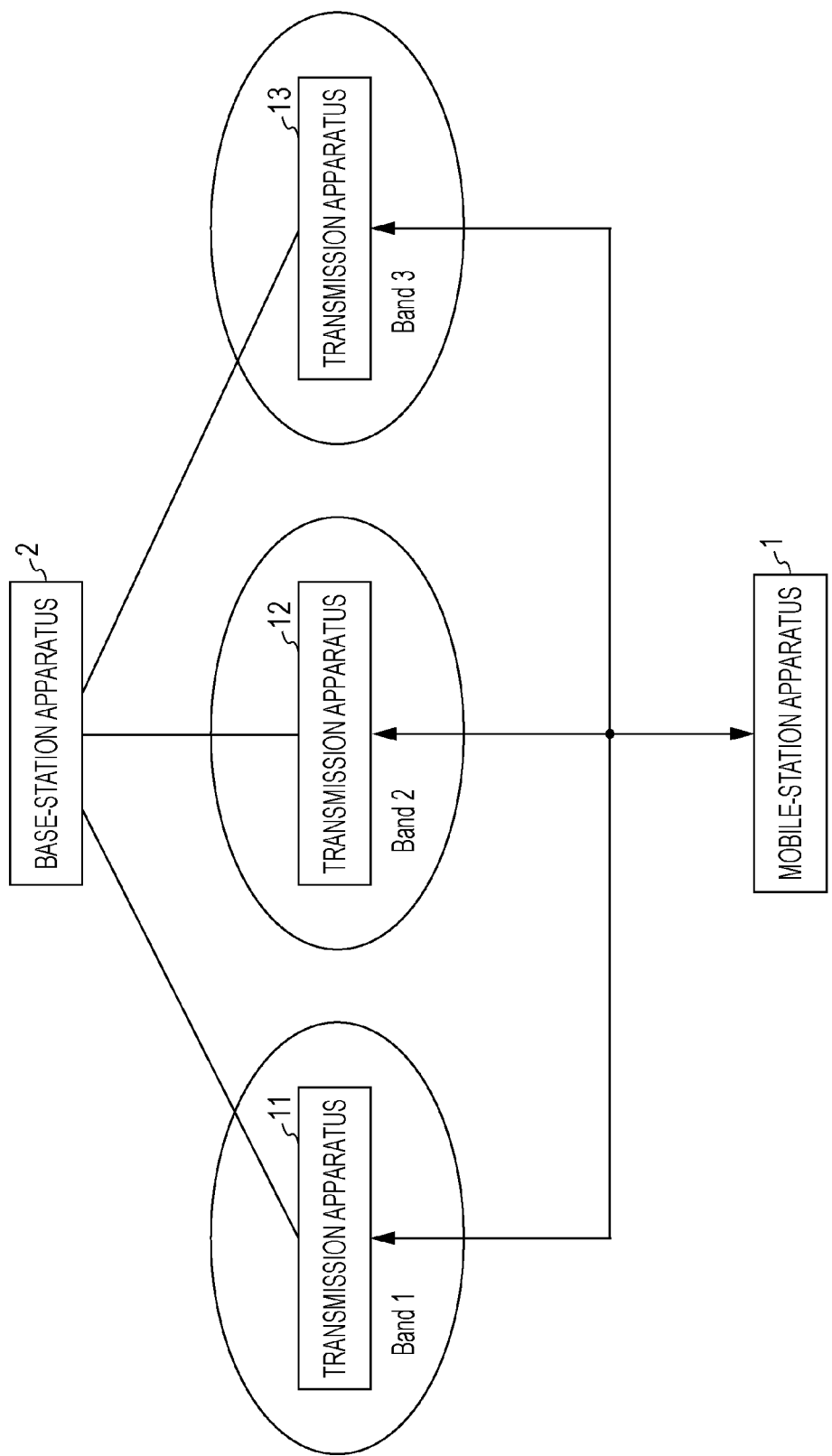
FIG. 14 is a diagram illustrating an example of a communication network configuration according to the embodiments of the invention.

FIG. 14 is a diagram illustrating an example of a communication network configuration according to embodiments of the invention. In a case where a mobile-station apparatus 1 can be radio-connected to a base-station apparatus 2 by simultaneously using frequency bands of a plurality of frequencies (component carriers, Band 1 to Band 3) by performing carrier aggregation, as a communication network configuration, a configuration, in which one arbitrary base-station apparatus 2 includes transmission apparatuses 11 to 13 (and reception apparatuses 21 to 23 (not shown)) for a plurality of frequencies, and control of respective frequencies is performed by one base-station apparatus 2, is suitable from the viewpoint of simplification of control. The configuration of the base-station apparatus 2 is not limited to FIG. 14.

However, when a plurality of frequencies are contiguous frequencies, the base-station apparatus 2 may be configured to perform transmission of a plurality of frequencies with one transmission apparatus. In addition, a transmission and reception timing may be different for each frequency. The number of transmission apparatuses and reception apparatuses may be different or transmittable and receivable frequencies may be different. A communication possible range of each frequency, which is controlled by the transmission apparatus of the base-station apparatus 2, is regarded as a cell. At this time, an area (cell), which is covered with each frequency, may have an area or shape different in each case. In addition, a covering area may be different for each frequency.

However, in the following description, a description will be made by referring to the area covered with a frequency of a component carrier constituted by the base-station apparatus 2 as a cell, but it should be considered that this reference may be different from the definition of a cell in a communication system in which the mobile-station apparatus or the base-station apparatus in respective embodiments of the invention are in practical use. For example, in an arbitrary communication system, a part of component carriers that are used by the carrier aggregation may be defined as an additional simple radio resource other than the cell. In addition, the component carrier may be defined as an extension cell different from a cell in the related art. Even when the component carrier is referred to as a cell in respective embodiment of the invention and is different from the definition of the cell in communication system in practical use, this has no effect on the gist of the respective embodiments of the invention.

In addition, the carrier aggregation is communication with a plurality of cells by using a plurality of component carriers (frequency bands), and is also referred to as cell aggregation. In addition, the mobile-station apparatus 1 may be wirelessly connected to the base-station apparatus 2 through a relay station apparatus (or repeater) for each frequency. That is, the base-station apparatus 2 of the respective embodiments of the invention may be substituted with a relay station apparatus.

The base-station apparatus 2 of a third generation, which is defined in 3GPP, is referred to as NodeB, and a base-station apparatus in EUTRA and advanced EUTRA is also referred to as eNodeB. In addition, the mobile-station apparatus 1 of a third generation, which is defined by 3GPP, is referred to as UE (User Equipment). The base-station apparatus 2 manages a cell that is an area in which communication of the mobile-station apparatus 1 is possible, and the cell is also referred to as a macro cell, a femtocell, a picocell, or a nanocell in accordance with the size of the area in which communication with the mobile-station apparatus 1 is possible. In addition, when the mobile-station apparatus 1 can establish communication with an arbitrary base-station apparatus 2, among cells of the base-station apparatus 2, a cell that is used for communication with the mobile-station apparatus 1 is a serving cell, and the other cells are referred to as neighboring cells. That is, in a case where the mobile-station apparatus 1 and the base-station apparatus 2 are in communication by using a plurality of cells using the carrier aggregation, a plurality of the serving cells are present for the mobile-station apparatus 1.

In addition, when being simply referred to as a mobile-station apparatus or a base-station apparatus in the respective embodiments, the mobile-station apparatus and the base-station apparatus represent a mobile-station apparatus and a base-station apparatus which support communication established by aggregating cells having a plurality of different uplink transmission timings in accordance with the carrier aggregation.

[Component Carrier Configuration]

Figure 15:
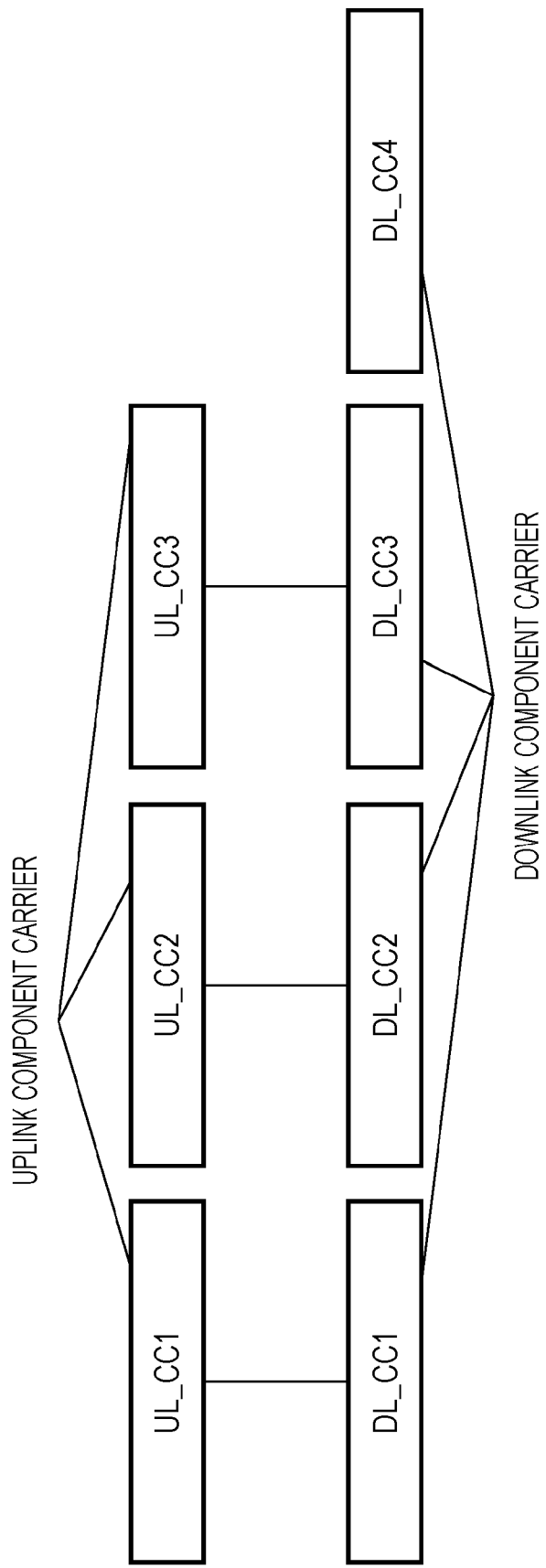
FIG. 15 is a diagram illustrating an example of component carrier configuration with respect to the mobile-station apparatus according to the embodiments of the invention.

FIG. 15 is a diagram illustrating an example of a correspondence relation between a downlink component carrier and an uplink component carrier that are configured with respect to the mobile-station apparatus 1 by the base-station apparatus 2 in a case where the mobile-station apparatus 1 according to the embodiments of the invention performs carrier aggregation. FIG. 15 illustrates a correspondence relation between four downlink component carriers (downlink component carriers DL_CC1 to DL_CC4) and three uplink component carriers (uplink component carriers UL_CC1 to UL_CC3), but the embodiments of the invention are not limited to the configuration of the example of configuring the component carriers shown in FIG. 15.

The downlink component carrier DL_CC1 and the uplink component carrier UL_CC1, the downlink component carrier DL_CC2 and the uplink component carrier UL_CC2, and the downlink component carrier DL_CC3 and the uplink component carrier UL_CC3 in FIG. 15 are referred to as a cell-specific linkage. In addition, similar to the downlink component carrier DL_CC4, a component carrier for only the downlink without a configuration of an uplink component carrier (without the cell-specific linkage) may be configured for the carrier aggregation.

The cell-specific linkage is a correspondence relation (co-ordination relation, link information) between component carriers of an uplink and a downlink, and a correspondence relation is typically shown at a part (SIB2; System Information Block Type 2) of broadcast information. The cell-specific linkage is also referred to as an SIB2 linkage, and a configuration is explicitly notified as a part of broadcast information. In addition, in a case of adding a component carrier (cell) in the carrier aggregation, a configuration of the correspondence relation is notified as an RRC message (Layer 3 message) or the configuration is implicitly notified by using information of a correspondence relation between definition of the uplink and definition of the downlink which are uniquely determined in a case of not being apparently instructed. In a case of using the RRC message, the base-station apparatus 2 may notify the mobile-station apparatus 1 of information of a different cell-specific linkage with an uplink component carrier which is shown as broadcast information of the downlink component carrier that is configured.

In contrast, the base-station apparatus 2 may individually configure the correspondence relation between the downlink component carrier and the uplink component carrier for each mobile-station apparatus 1 (individual linkage; UE-Specific Linkage) separately from the cell-specific linkage. At this time, the configuration of the individual-linkage is shown with an RRC message (Layer 3 message). The base-station apparatus 2 may allocate a plurality of the configurations necessary for transmission of the physical random access channel for each uplink component carrier or for each uplink frequency.

In a case where the mobile-station apparatus 1 does not perform the carrier aggregation, the cell-specific linkage is typically used to show a correspondence relation between frequencies of the uplink and the downlink which are used for communication with the base-station apparatus 2. In addition, the cell-specific linkage is used to show a correspondence relation between component carriers of the uplink and the downlink to which radio resource allocation notified by the physical downlink control channel during carrier aggregation is applied.

The individual linkage is typically used to calculate a path loss used for transmission power control of the uplink component carrier of the mobile-station apparatus 1 on the base of quality of which downlink component carrier. In addition, the individual linkage is used to show that the physical downlink control channel PDCCH, which notifies radio resource allocation information to perform scheduling (radio resource allocation) of the component carrier of the mobile-station apparatus 1, is transmitted by which downlink component carrier.

A cell, which is constituted by the uplink component carrier in which the uplink control channel configuration for radio resource request is performed, and the downlink component carrier that is connected to the uplink component carrier in cell-specific linkage, is referred to as a primary cell (PCell). In addition, a cell, which is constituted by a component carrier other than the primary cell, is referred to as a secondary cell (SCell).

The mobile-station apparatus 1 performs reception of a paging message, detection of broadcast information updating, an initial access procedure, random access for scheduling request, and the like by the primary cell. On the other hand, these are not performed in the secondary cell. The primary cell is not subjected to control of activation and deactivation (that is, the primary cell is regarded to be always activated). However, the secondary cell has an activation state and a deactivation state, and change of these states is apparently designated from the base-station apparatus 2, and the states are changed on the basis of a timer that is configured in the mobile-station apparatus 1 for each component carrier. As described above, the primary cell and the secondary cell are collectively referred to as a serving cell.

The mobile-station apparatus 1 and the base-station apparatus 2 allocate a cell index with respect to the primary cell and the secondary cell to identify the secondary cell, and identify the serving cell that is an object to be added, deleted, or changed by using the cell index. The cell index of the primary cell is always zero, and any one of 1 to 7 is allocated to the cell index of the secondary cell.

Here, the activation or deactivation of the component carrier (that is, activation or deactivation of the secondary cell) is controlled by an L2 (Layer 2) message that can be analyzed by a configuration task of a Layer 2. That is, the activation or deactivation is controlled by a control command that is decoded in a physical layer (Layer 1) and is recognized in the Layer 2. In addition, the L2 message in EUTRA and advanced EUTRA is notified by a control command (MAC control element) that is analyzed in a MAC layer.

The mobile-station apparatus 1 may stop the monitoring of the uplink grant and the downlink grant (downlink assignment) that are used for scheduling of a component carrier (secondary cell) that is deactivated. That is, the monitoring of the physical downlink control channel may be stopped. In addition, the mobile-station apparatus 1 may stop transmission of a periodic sounding reference signal (periodic SRS) that is an uplink reference signal with respect to the uplink of the component carrier (secondary cell) that is deactivated. In addition, the mobile-station apparatus 1 may stop transmission of the physical uplink control channel with respect to the uplink of a component carrier (secondary cell) that is deactivated. In addition, the mobile-station apparatus 1 may perform measurement at a sampling rate lower than a sampling rate in an activated state with respect to the downlink of the component carrier (secondary cell) that is deactivated.

[Random Access Procedure]

A series of procedure relating to the random access is referred to as a random access procedure. The random access procedure includes two sequences including a contention based random access and a non-contention based random access procedure.

The contention based random access procedure is a random access procedure in which preamble sequences transmitted from different mobile-station apparatuses may collide with each other (contention), and is used for an initial access from a state in which connection (communication) is not established between the mobile-station apparatus and the base-station apparatus, scheduling request for requesting a transmission resource of the uplink from a state in which the mobile-station apparatus and the base-station apparatus are connected to each other, and the like. The collision of the preamble sequences represents that a plurality of mobile-station apparatuses transmit the physical random access channel by using the same frequency and time resource by using the same preamble sequence. In addition, the collision of the preamble sequences is also referred to as collision of random access.

The non-contention based random access procedure is a random access procedure in which collision does not occur in preamble sequences transmitted from different mobile-station apparatuses. The random access procedure is initiated by an instruction of the base-station apparatus in a state in which the mobile-station apparatus is connected to the base-station apparatus and synchronization of the uplink deviates. Initiation of the non-contention based random access procedure is instructed by a message of the RRC (Radio Resource Control; Layer 3) layer and control data of the physical downlink control channel PDCCH.

The preamble sequence (dedicated preamble) that is used as the non-contention based random access procedure is individually notified to the mobile-station apparatus from the base-station apparatus. With regard to the preamble sequence that is used as the contention based random access procedure, the mobile-station apparatus randomly selects and uses one preamble sequence from preamble sequences that is not used as the dedicated preamble during random access. Among preamble sequences which can be used by the mobile-station apparatus in an arbitrary cell, the number of preamble sequences that are used in the contention based random access procedure and the non-contention based random access procedure, respectively, is notified from the base-station apparatus.

Figure 16:
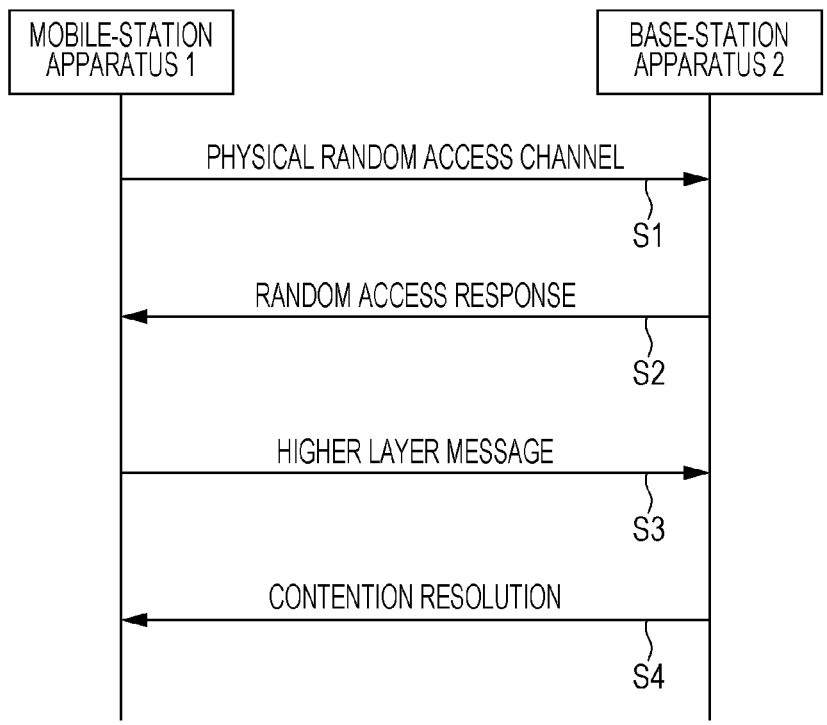
FIG. 16 is a diagram illustrating a sequence chart illustrating a contention based random access procedure.

The contention based random access procedure will be briefly described with reference to FIG. 16. First, the mobile-station apparatus 1 transmits the preamble sequence (random access preamble), which is selected on the basis of a radio channel loss (path loss) of the downlink or the size of Message 3 (message transmitted in step S3), to the base-station apparatus 2 (step S1). The base-station apparatus 2, which receives the random access preamble, calculates an amount of deviation in a transmission timing between the mobile-station apparatus 1 and the base-station apparatus 2 from the random access preamble, and transmits a response (random access response) for the random access preamble in combination with transmission timing adjustment information which is included in the response and adjusts the deviation in the transmission timing to the mobile-station apparatus 1 (step S2).

The mobile-station apparatus 1 confirms the contents of the random access response, and in a case where a preamble number, which corresponds to the transmitted random access preamble, is included in the random access response, the mobile-station apparatus 1 adjusts the uplink transmission timing from the transmission timing adjustment information. In a case of adjusting the transmission timing, the mobile-station apparatus 1 starts a transmission timing timer (TA timer; TAT) indicating that the adjusted transmission timing is available.

In addition, the mobile-station apparatus 1 transmits a message of a higher layer (higher layer message, RRC message) on the basis of scheduling information included in the random access response to the base-station apparatus 2 (step S3). The base-station apparatus 2 transmits a collision confirmation message (contention resolution) to the mobile-station apparatus 1 that can receive the higher layer message in step S3 (step S4), and completes the procedure.

Figure 17:
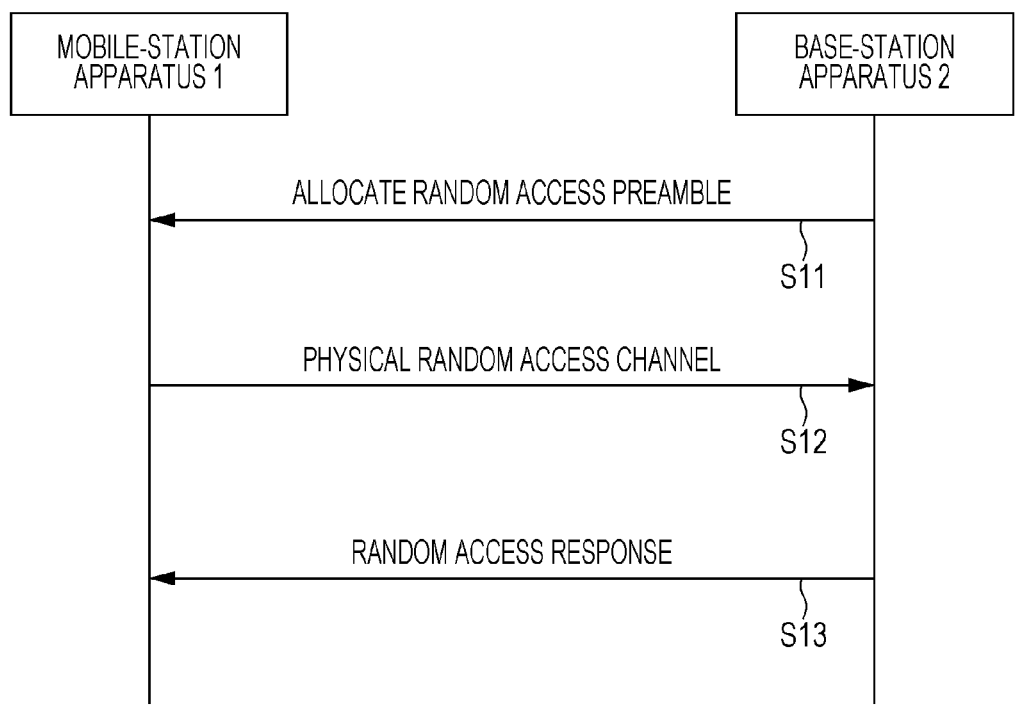
FIG. 17 is a sequence chart illustrating a non-contention based random access procedure.

The non-contention based random access procedure will be briefly described with reference to FIG. 17. First, the base-station apparatus 2 notifies the mobile-station apparatus 1 of a number of the dedicated preamble and a number of the physical random access channel that is used (random access channel number) (allocation of the random access preamble) (step S11). The random access channel number is a number indicating a subframe that permits transmission of the physical random access channel by using the dedicated preamble (or a number of the dedicated preamble) notified to the mobile-station apparatus 1 by the base-station apparatus 2. For example, an arbitrary random access channel number indicates that the dedicated preamble may be transmitted through the entirety of physical random access channels, and an arbitrary random access channel number indicates that the dedicated preamble may be transmitted by every two physical random access channels in a time direction.

The random access preamble allocation is notified to the mobile-station apparatus 1 from the base-station apparatus 2 by using the physical downlink control channel or the RRC message.

The mobile-station apparatus 1 transmits a preamble sequence (dedicated preamble), which corresponds to the number of a preamble that is designated, with a physical random access channel to which transmission of the dedicated preamble indicated by the random access channel number is permitted (step S12). The base-station apparatus 2, which receives the dedicated preamble, calculates an amount of deviation in a transmission timing between the mobile-station apparatus 1 and the base-station apparatus 2 from the dedicated preamble, and transmits a response (random access response) for the dedicated preamble in combination with transmission timing adjustment information which is included in the response and adjusts the deviation in the transmission timing to the mobile-station apparatus 1 (step S13), and completes the procedure.

However, in a case where a value of the preamble number which is notified from the base-station apparatus 2 shows a specific value (for example, zero), the mobile-station apparatus 1 performs the contention based random access procedure instead of the non-contention based random access procedure. In this case, the mobile-station apparatus 1 completes the random access procedure according to the procedure of step S1 to step S4 in FIG. 16.

Hereinafter, appropriate embodiments of the invention will be described in detail with reference to the attached drawings while considering the above-described circumstances. In addition, in the description of the embodiments of the invention, in a case where it is determined that a specific description with respect to a known function or configuration relating to the embodiments of the invention makes the gist of the embodiments of the invention ambiguous, the detailed description will be omitted.

First Embodiment

A first embodiment of the invention will be described below. This embodiment relates to a method for controlling uplink transmission during the carrier aggregation of the mobile-station apparatus 1, and particularly, this embodiment shows a method for controlling uplink transmission in a case where the mobile-station apparatus 1 manages a plurality of uplink transmission timings.

FIG. 1 is a block diagram illustrating an example of a configuration of a mobile-station apparatus 1 according to the first embodiment of the invention. The mobile-station apparatus 1 includes a reception unit 101, a demodulation unit 102, a decoding unit 103, a measurement processing unit 104, a control unit 105, a random access control unit 106, a coding unit 107, a modulation unit 108, a transmission unit 109, a timing management unit 110, and a higher layer 111. The higher layer 111 includes an RRC (Radio Resource Control) layer that performs radio resource control. In addition, the random access control unit 106 and the timing management unit 110 are blocks realizing a specific function of a MAC (Management Access Control) layer that manages a data link layer.

In addition, the mobile-station apparatus 1 may include a plurality of reception-based blocks (the reception unit 101, the demodulation unit 102, and the decoding unit 103) and a plurality of transmission-based blocks (the coding unit 107, the modulation unit 108, and the transmission unit 109) to support a plurality of frequencies (frequency bands, frequency bandwidths).

With regard to reception, mobile-station apparatus control information is input from the higher layer 111 to the control unit 105, and reception-related control information is appropriately input to the reception unit 101, the demodulation unit 102, and the decoding unit 103 as reception control information. The mobile-station apparatus control information is information which is necessary for radio communication control of the mobile-station apparatus 1 and which is constituted by reception control information and transmission control information. The mobile-station apparatus control information is configured by the base-station apparatus 2 or system parameters, and is input to the control unit 105 by the higher layer 111 as necessary. In addition, in addition to information of reception frequency band, information such as a reception timing relating to each channel, a multiplexing method, and radio resource mapping information is included in the reception control information.

The receive signal is received in the reception unit 101. The reception unit 101 receives the signal with a frequency band designated by the reception control information. The signal that is received is input to the demodulation unit 102. The demodulation unit 102 demodulates the receive signal, and inputs the signal to the decoding unit 103 to correctly decode downlink data and downlink control data. Each piece of data that is decoded is input to the higher layer 111.

The measurement processing unit 104 creates downlink measurement information on the basis of results of measurement about a reception quality (SIR, SINR, RSRP, RSRQ, RSSI, path loss, and the like) of a downlink reference signal for each cell (component carrier) or measurement about a reception error rate of a physical downlink control channel or a physical downlink shared channel, and outputs downlink measurement information to the higher layer 111. In addition, the measurement processing unit 104 measures a timing of a downlink physical channel which is received as necessary, and input the resultant received timing information to the timing management unit 110. The downlink measurement information is used to perform detection of radio link failure which is accompanied with radio link re-establishment, and radio link monitoring which is accompanied with stopping of uplink transmission in the higher layer 111.

In addition, with regard to transmission, the mobile-station apparatus control information is input to the control unit 105 from the higher layer 111, and transmission-related control information is appropriately input to the random access control unit 106, the coding unit 107, the modulation unit 108, and the transmission unit 109 as transmission control information. Information such as coding information, modulation information, information of a transmission frequency band, a transmission timing relating to each channel, a multiplexing method, and radio resource mapping information is included in the transmission control information as uplink scheduling information of the transmit signal.

The random access configuration information is input to the random access control unit 106 from the higher layer 111. Preamble information, radio resource information for physical random access channel transmission, and the like are included in the random access configuration information. The higher layer 111 configures transmission timing adjustment information that is used to adjust an uplink transmission timing and a transmission timing timer to the timing management unit 110 as necessary. The timing management unit 110 manages a state of the uplink transmission timing (a transmission timing adjustment state or a transmission timing non-adjustment state) for each cell (or for each cell group and for each TA group) on the basis of a reception timing input from the measurement processing unit 104, or timing information configured by the higher layer 111.

In a case where it is necessary to manage the state of a plurality of uplink transmission timings, the higher layer 111 configures transmission timing adjustment information, which corresponds to an uplink transmission timing of each of a plurality of cells (or cell groups, TA groups), in the timing management unit 110.

In addition to the uplink data and the uplink control data which are input from the higher layer 111, random access data information relating to transmission of the physical random access channel is input to the coding unit 107 from the random access control unit 106. The coding unit 107 creates a preamble sequence, which is transmitted with a physical random access channel, on the basis of the random access data information. In addition, the coding unit 107 appropriately codes each data in accordance with the transmission control information, and outputs the resultant coded data to the modulation unit 108.

The modulation unit 108 modulates an output from the coding unit 107. The transmission unit 109 performs mapping of an output of the modulation unit 108 to a frequency domain, converts a signal of the frequency domain to a signal of a time domain, and carries the resultant signal on a carrier wave of a predetermined frequency to perform power amplification. In addition, the transmission unit 109 adjusts the uplink transmission timing in accordance with the transmission timing adjustment information for each cell (or each cell group, each TA group) which is input from the timing management unit 110 and transmits the resultant uplink transmission timing that is adjusted. The physical uplink shared channel in which the uplink control data is mapped may include, for example, a Layer 3 message (radio resource control message; RRC message) in addition to user data. In FIG. 1, the other constituent elements of the mobile-station apparatus 1 are omitted because the constituent elements have no strong relation with this embodiment. However, it is apparent that the mobile-station apparatus 1 includes a plurality of blocks, which have the other functions necessary for operation, as constituent elements.

Figure 2:
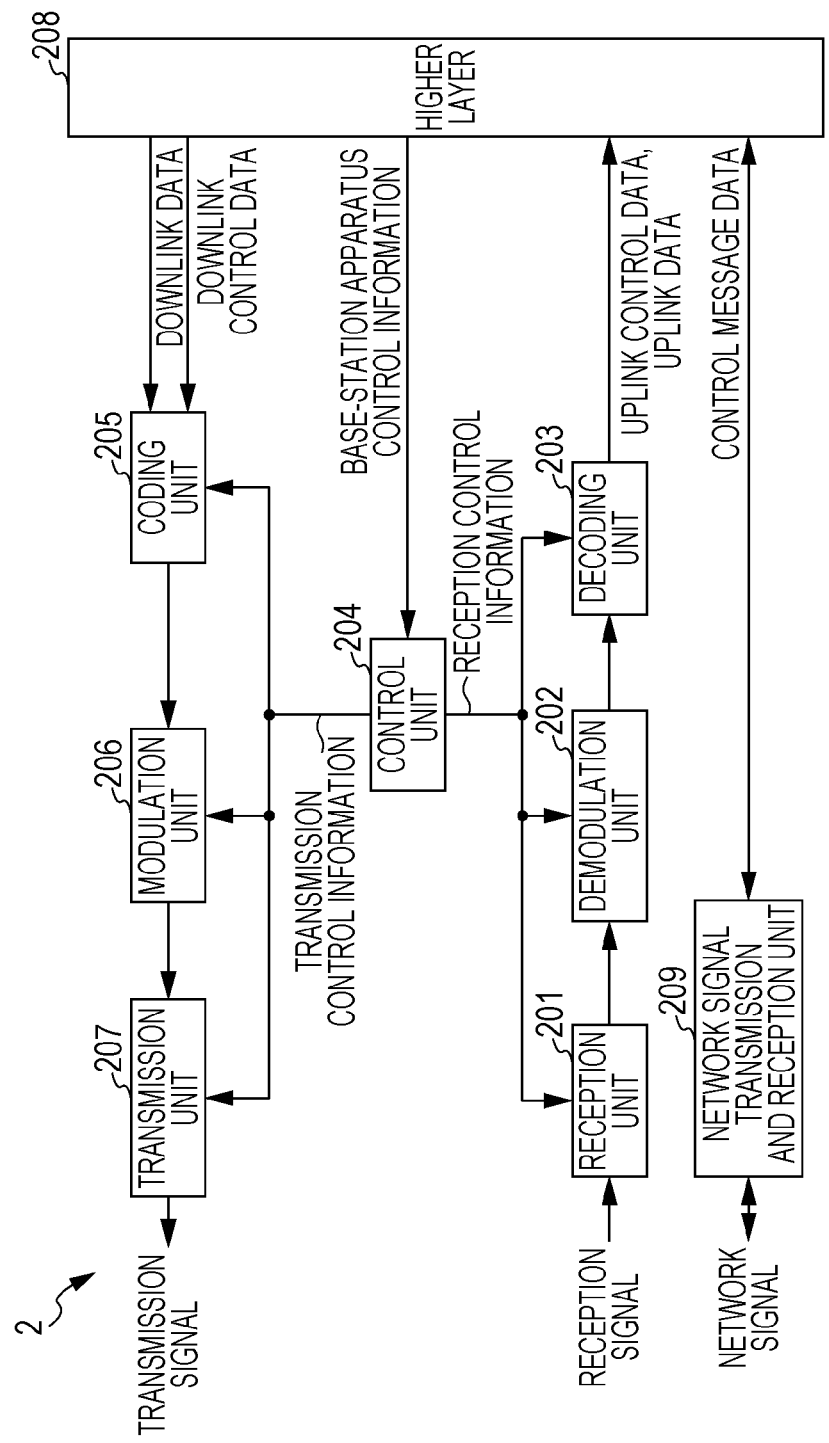
FIG. 2 is a block diagram illustrating a schematic configuration of a base-station apparatus in the embodiments of the invention.

FIG. 2 is a block diagram illustrating an example of the base-station apparatus 2 according to the first embodiment of the invention. The base-station apparatus includes a reception unit 201, a demodulation unit 202, a decoding unit 203, a control unit 204, a coding unit 205, a modulation unit 206, a transmission unit 207, a higher layer 208, and a network signal transmission and reception unit 209. In addition, the base-station apparatus 2 may include a plurality of reception-based blocks (the reception unit 201, the demodulation unit 202, and the decoding unit 203) and a plurality of transmission-based blocks (the coding unit 205, the modulation unit 206, and the transmission unit 207) to support a plurality of frequencies (frequency bands, frequency bandwidths).

The higher layer 208 inputs downlink data and downlink control data to the coding unit 205. The coding unit 205 codes the input data and inputs the coded data to the modulation unit 206. The modulation unit 206 performs modulation of the coded signal. In addition, the signal that is output from the modulation unit 206 is input to the transmission unit 207. The transmission unit 207 performs mapping of the input signal to a frequency domain, converts a signal of the frequency domain to a signal of a time domain, and transmits the resultant signal after carrying the signal on a carrier wave of a predetermined frequency to perform power amplification. The downlink shared channel in which the downlink control data is mapped typically constitutes a Layer 3 message (RRC message).

In addition, the reception unit 201 converts the signal received from the mobile-station apparatus 1 into a digital signal of a base band. In a case where a cell of a plurality of different transmission timings is configured with respect to the mobile-station apparatus 1, the reception unit 201 receives a signal at a timing different for each cell (or for each cell group, for each TA group). The digital signal that is converted in the reception unit 201 is input to the demodulation unit 202 and is demodulated. The signal that is demodulated in the demodulation unit 202 is input to the decoding unit 203 and is decoded, and the decoding unit 203 outputs uplink control data or uplink data that is correctly decoded to the higher layer 208. Base-station apparatus control information, which is necessary for control of each of these blocks, is information which is constituted by reception control information and transmission control information and which is necessary for radio communication control of the base-station apparatus 2. The base-station apparatus control information is configured by a higher layer network apparatus (MME or gateway apparatus, OAM) or system parameters, and is input to the control unit 204 by the higher layer 208 as necessary.

The control unit 204 inputs transmission-related base-station apparatus control information to each block of the coding unit 205, the modulation unit 206, and the transmission unit 207 as transmission control information, and the control unit 204 appropriately inputs reception-related base-station apparatus control information to each block of the reception unit 201, the demodulation unit 202, and the decoding unit 203 as reception control information. The RRC of the base-station apparatus 2 is present as a part of the higher layer 208.

On the other hand, the network signal transmission and reception unit 209 performs transmission or reception of a control message or user data between the base-station apparatuses 2 or between a higher layer network apparatus and the base-station apparatus 2. In FIG. 2, the other constituent elements of the base-station apparatus 2 are omitted because the constituent elements have no strong relation with this embodiment. However, it is apparent that the base-station apparatus 2 includes a plurality of blocks, which have the other functions necessary for operation, as constituent elements.

In addition, as a network configuration of a communication system in which the mobile-station apparatus 1 and the base-station apparatus 2 are disposed, the same network configuration shown in FIG. 14 may be applied.

Figure 3:
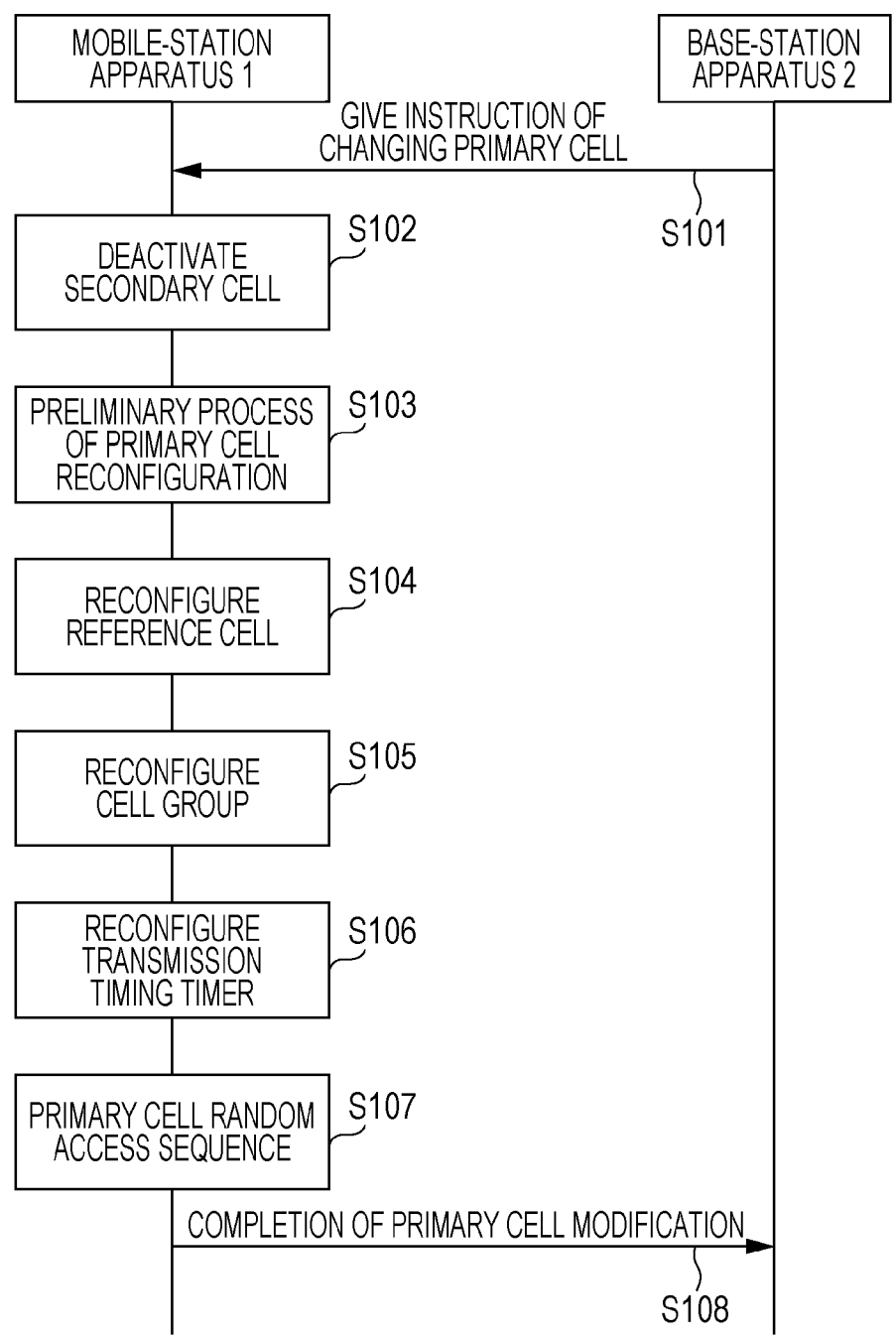
FIG. 3 is a sequence chart illustrating a primary cell modification procedure in a first embodiment of the invention.

FIG. 3 is a sequence chart illustrating a primary cell modification procedure in the mobile-station apparatus 1 and the base-station apparatus 2 according to this embodiment. The mobile-station apparatus 1 of this sequence chart initiates operation from a state (connected state) of being connected to the base-station apparatus 2 through at least the primary cell and one or more secondary cells in which the uplink transmission timing is different from that of the primary cell.

Although being omitted in FIG. 3, the mobile-station apparatus 1 transmits mobile-station apparatus capability notification message (UE Capability) to the base-station apparatus 2 by using an RRC message before step S101. At least physical layer-related parameters such as the number of antennas of the mobile-station apparatus 1, a transmittable and receivable frequency band (bandEUTRA) in EUTRA, random access capability, MIMO capability, radio parameters (RF parameters) such as a combination (Support Band Combination) of frequency bands with which carrier aggregation is possible, and measurement parameters indicating a frequency band capable of being measured without a measurement gap are configured in the mobile-station apparatus capability notification message, and the base-station apparatus 2 can perform appropriate communication resource configuration, measurement configuration, and secondary cell configuration with respect to the mobile-station apparatus 1 on the basis of the contents of the mobile-station apparatus capability notification message.

Figure 4:
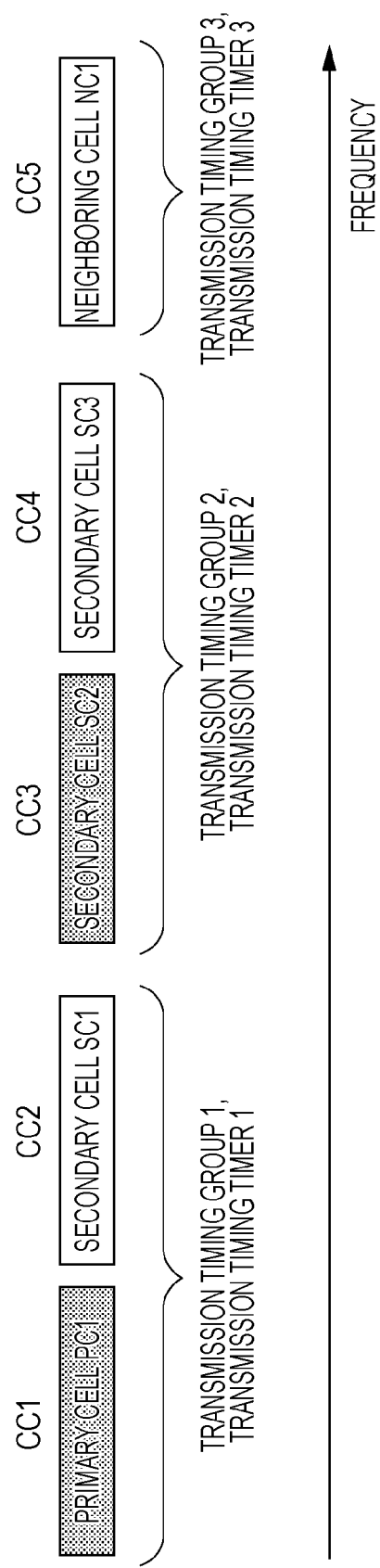
FIG. 4 is a diagram illustrating an example of cell configurations having a plurality of uplink transmission timings in the first embodiment of the invention.

FIG. 4 illustrates an example of a carrier aggregation state of the mobile-station apparatus 1 and the base-station apparatus 2 in FIG. 3. Component carriers CC1 to CC5 indicate different frequencies. A primary cell PC1 is a cell of the component carrier CC1. A secondary cell SC1 is a cell of the component carrier CC2. A secondary cell SC2 is a cell of the component carrier CC3. A secondary cell SC3 is a cell of the component carrier CC4. In addition, a cell (neighboring cell NC1) that does not constitute the carrier aggregation is a cell of the component carrier CC5.

Here, the primary cell PC1 and the secondary cell SC1 belong to a transmission timing group 1, and a timer that manages the uplink transmission timing in the transmission timing group 1 is a transmission timing timer 1. Similarly, the secondary cell SC2 and the secondary cell SC3 belong to a transmission timing group 2, and a timer that manages the uplink transmission timing in the transmission timing group 2 is a transmission timing timer 2. That is, the uplink transmission timing is different between the cells (the primary cell PC1 and the secondary cell SC1) of the transmission timing group 1, and the cells (the secondary cell SC2 and the secondary cell SC3) of the transmission timing group 2.

The transmission timing group (transmission timing group 1), which is constituted by cells including the primary cell, is referred to as a primary transmission timing group (pTAG). In addition, the transmission timing group (transmission timing group 2), which is constituted by only the secondary cells, is referred to as a secondary transmission timing group (sTAG). A plurality of the secondary transmission timing groups may be configured with respect to the mobile-station apparatus 1.

To determine that a serving cell (primary cell, secondary cell) belongs to which transmission timing group, the base-station apparatus 2 configures a transmission timing group identifier (TAG-ID) to the serving cell with respect to the mobile-station apparatus 1. It is preferable that the transmission timing group identifier (TAG-ID) be notified from the base-station apparatus 2 in the RRC message, and the transmission timing group identifier (TAG-ID) is commonly notified with a broadcast information channel or individually notified for each mobile-station apparatus 1 in a control message. The transmission timing group identifier may be simply referred to as a group identifier.

In the following description, it is assumed that, TAG1 has been configured as the transmission timing group identifier of the transmission timing group 1, and TAG2 has been configured as the transmission timing group identifier of the transmission timing group 2. In addition, it is assumed that TAT1 has been configured as the transmission timing timer 1 of the transmission timing group 1, and TAT2 has been configured as the transmission timing timer 2 of the transmission timing group 2. The length of the transmission timing timer may be a value common to all of the transmission timing groups, or may be a value different in each transmission timing group.

In addition, the base-station apparatus 2 may implicitly notify the mobile-station apparatus 1 of configuration of a default value (for example, zero) as the transmission timing group identifier of a corresponding cell without notifying the mobile-station apparatus 1 of the transmission timing group identifier. In addition, in a case where transmission timing group identifier is not notified from the base-station apparatus 2, the mobile-station apparatus 1 may determine that a default value is configured as the transmission timing group identifier of a corresponding cell.

In FIG. 4, it is assumed that a reference cell (hereinafter, referred to as a timing reference cell), which is used as a reference of the transmission timing in the transmission timing group 1, is the primary cell PC1, and a timing reference cell in the transmission timing group 2 is the secondary cell SC2. The timing reference cell is a cell that is used as a reference of calculation, adjustment, and updating of the transmission timing of the transmission timing group including the corresponding timing reference cell, and is not configured as a transmission timing of a cell in a different transmission timing group.

In addition, the cell (neighboring cell NC1), which does not constitute the carrier aggregation, may be a cell that belongs to an arbitrary transmission timing group, a cell in a new transmission timing group, or a cell in which the transmission timing group has not been configured yet. In FIG. 4, the neighboring cell NC1 is described as the cell in the new transmission timing group (transmission timing group 3).

One timing reference cell is present for each group at all times. In the primary transmission timing group, the timing reference cell is the primary cell. On the other hand, in the secondary transmission timing group, the timing reference cell is any one of secondary cells that constitute the secondary transmission timing group. The mobile-station apparatus 1 may regard the secondary cell in which the random access procedure succeeds as the timing reference cell, and the mobile-station apparatus 1 may regard a secondary cell that is configured with an MAC information element or an RRC message from the base-station apparatus 2 as the timing reference cell.

In addition, a cell that is used for calculation of a path loss indicating a propagation channel loss of the downlink reference signal is referred to as a path loss reference cell, and the path loss reference cell is configured for each secondary cell in which an uplink configuration is present. The path loss reference cell of the primary cell is configured with the primary cell at all times, but as the path loss reference cell of the secondary cell in which the uplink configuration is present, any one of the primary cell or the secondary cell is configured. However, the path loss reference cell of the secondary cell, which constitutes the secondary transmission timing group (sTAG), is configured with the secondary cell at all times.

Hereinafter, a control procedure of the mobile-station apparatus 1 and the base-station apparatus 2, which are in the carrier aggregation state (cell configuration) in FIG. 4, will be described for explanation of an operation, but an actual carrier aggregation state (cell configuration) of the mobile-station apparatus 1 and the base-station apparatus 2 is not limited to the configuration of FIG. 4.

Returning to FIG. 3, when determining that it is necessary to change a cell (source primary cell) currently operating as the primary cell, the base-station apparatus 2 transmits a message (primary cell modification instruction message) that instructs modification of the primary cell to the mobile-station apparatus 1 (step S100). When the primary cell (source primary cell) of the mobile-station apparatus 1 is changed, the base-station apparatus 2 may consider a report (measurement report) of measurement results, which is transmitted from the mobile-station apparatus 1, a load situation of each frequency, and whether or not MBMS is received. In addition, "giving an instruction" means that control parameters (information elements) relating to radio control, which have been configured in the mobile-station apparatus 1, are reconfigured.

At this time, cell information (a cell ID, a frequency ID, a cell index, and the like) which designates a cell (a target primary cell) that newly operates as the primary cell at a change destination, broadcast information (a frequency bandwidth, a common radio resource configuration information, and the like) that is transmitted by the target primary cell, physical channel configuration information for access to the target primary cell, random access configuration information, and the like are configured in the primary cell modification instruction message.

The base-station apparatus 2 may initiate the non-contention based random access procedure by configuring an dedicated preamble as one of random access configuration information to the mobile-station apparatus 1, or initiate the non-contention based random access procedure without configuring the dedicated preamble to the mobile-station apparatus 1.

The base-station apparatus 2 may allow configuration modification information of the secondary cell to be concurrently included in the primary cell modification instruction message. The configuration modification information of the secondary cell is information that instructs addition, deletion, configuration modification (reconfiguration) of the secondary cell. The mobile-station apparatus 1 that receives the primary cell modification instruction message changes all secondary cells that have been configured into a deactivation state. At this time, in a case where deletion of the secondary cell is instructed by the configuration modification information of the secondary cell, the mobile-station apparatus 1 deletes the secondary cell that is instructed, and changes the entirety of remaining secondary cells into a deactivation state (step S102). In order words, in step S102, the mobile-station apparatus 1 and the base-station apparatus 2 changes the entirety of serving cells other than the primary cell into a deactivation state.

Continuously, the mobile-station apparatus 1 determines a necessary control content (process) by performing a preliminary process of primary cell reconfiguration (step S103) in which the target primary cell and a current carrier aggregation state are compared with each other.

In addition, according to the control content (process) determined in step S103, the mobile-station apparatus 1 selects a necessary control content among step S104 to step S106, and performs the process. The processes of step S104 to step S106 may be performed in an arbitrary procedure instead of the procedure shown in FIG. 3. In addition, step S102 may be performed immediately after step S103 to step S106.

In step S104, the mobile-station apparatus 1 performs a reconfiguration process of reconfiguring the reference cell in a transmission timing group (also, referred to as a source primary cell group and a first group) of the source primary cell and a transmission timing group (also, referred to as a target primary cell group and a second group) of the target primary cell, respectively, as necessary.

In addition, in step S105, the mobile-station apparatus 1 performs a process of reconfiguring a cell group in the transmission timing group (source primary cell group) of the source primary cell and the transmission timing group (target primary cell group) of the target primary cell.

In addition, in step S106, the mobile-station apparatus 1 performs a process of reconfiguring a transmission timing timer in the transmission timing group (source primary cell group) of the source primary cell, and the transmission timing group (target primary cell group) of the target primary cell.

Figure 5:
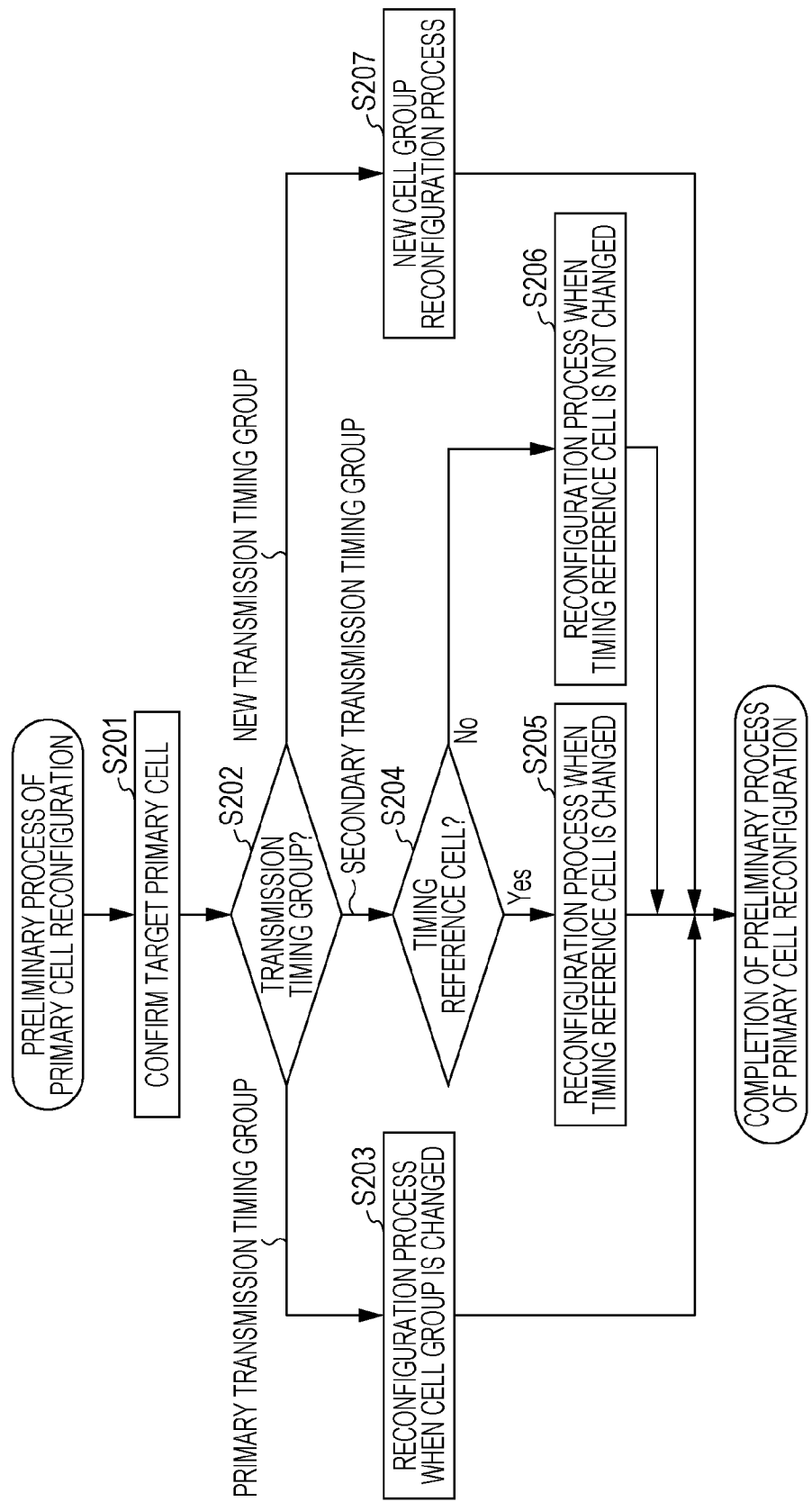
FIG. 5 is a flowchart illustrating a preliminary process of primary cell reconfiguration in the first embodiment of the invention.

FIG. 5 is a flowchart illustrating details of a process flow of the preliminary process of the primary cell reconfiguration in step S103. In step S201, the mobile-station apparatus 1 determines which cell is a newly designated target primary cell from the cell information (a cell ID, a frequency ID, and the like) of the primary cell modification instruction message.

In step S201, the mobile-station apparatus 1 confirms which transmission timing group configured in the mobile-station apparatus 1 the target primary cell designated with the primary cell modification instruction message belongs to. At this time, the mobile-station apparatus 1 confirms that the transmission timing group to which the target primary cell belongs is classified to any of (1) existing primary cell group (source primary cell group), (2) existing secondary cell group, and (3) new transmission timing group. In addition, in step S202, the mobile-station apparatus 1 determines a necessary control procedure on the basis of the transmission timing group classified in step S201.

In a case where the transmission timing group to which the target primary cell belongs is (1) existing primary cell group, the mobile-station apparatus 1 determines that a reconfiguration process when cell group is not changed (step S203) is necessary. In addition, in a case where the transmission timing group to which the target primary cell belongs is (2) existing secondary cell group, in step S204, the mobile-station apparatus 1 determines whether or not the target primary cell is the timing reference cell in the secondary cell group.

In a case where the target primary cell is the timing reference cell in the secondary cell group, the mobile-station apparatus 1 determines that a reconfiguration process when the timing reference cell is changed (step S205) is necessary. On the other hand, in a case where the target primary cell is not the timing reference cell in the secondary cell group, the mobile-station apparatus 1 determines that a reconfiguration process when the timing reference cell is not changed (step S206) is necessary.

In a case where the transmission timing group to which the target primary cell belongs is (3) new transmission timing group, the mobile-station apparatus 1 determines that a new cell group reconfiguration process (step S207) is necessary. In addition, after determination of these reconfiguration processes, the preliminary process of the primary cell reconfiguration is complete.

Figure 6:
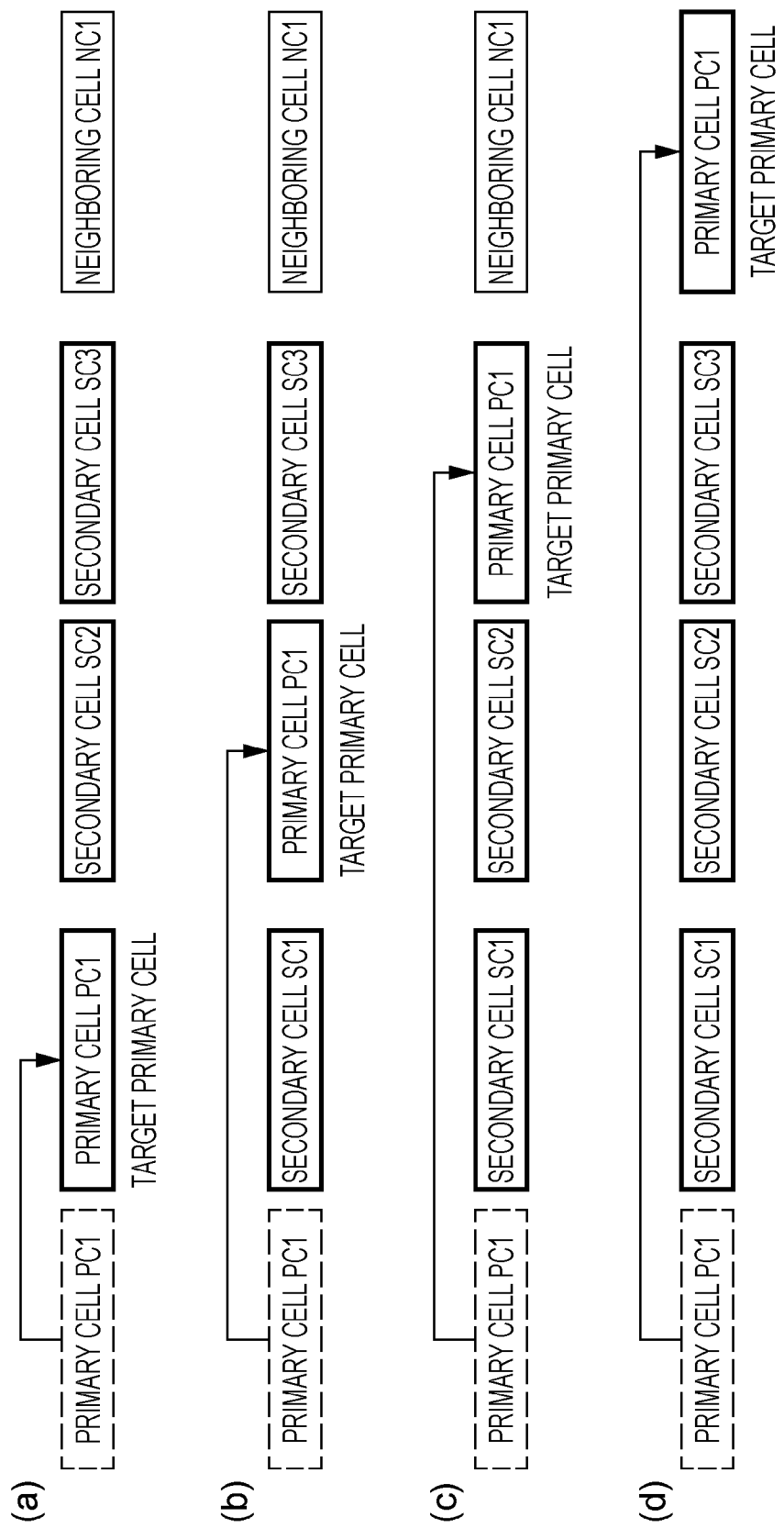
FIG. 6 is a diagram illustrating a reconfiguration process necessary during modification of a primary cell in the first embodiment of the invention.

FIG. 6 is a diagram illustrating that a reconfiguration process necessary on the basis of the transmission timing group of the primary cell after modification (target primary cell) is different in a case where the primary cell of the mobile-station apparatus 1 and the base-station apparatus 2 of the cell configuration shown in FIG. 4 is changed (reconfigured).

A first case (FIG. 6(a)) is a case in which the target primary cell is the cell (the secondary cell SC1 of FIG. 4) of the primary transmission timing group before modification, and in this case, the reconfiguration process when cell group is not changed (step S203 in FIG. 5) is applied. In addition, the target primary cell at this time may be a cell that is not configured without limitation to the secondary cell.

At this time, the mobile-station apparatus 1 and the base-station apparatus 2 determine that the reference cell reconfiguration (step S104 in FIG. 3) and the transmission timing timer reconfiguration (step S106 in FIG. 3) are necessary as the reconfiguration process when a cell group is not changed (step S203 in FIG. 5).

A second case (FIG. 6(b)) is a case in which the target primary cell is the timing reference cell (the secondary cell SC2 in FIG. 4) of the secondary transmission timing group before modification, and in this case, the reconfiguration process when the timing reference cell is changed (step S205 in FIG. 5) is applied. In addition, the target primary cell at this time may be a cell that has not been configured without limitation to the secondary cell.

At this time, the mobile-station apparatus 1 and the base-station apparatus 2 determine that the reference cell reconfiguration (step S104 in FIG. 3), the cell group reconfiguration (step S105 in FIG. 3), and the transmission timing timer reconfiguration (step S106 in FIG. 3) are necessary as the reconfiguration process when a timing reference cell is changed (step S205 in FIG. 5).

A third case (FIG. 6(c)) is a case in which the target primary cell is a cell (the secondary cell SC3 in FIG. 4) other than the timing reference cell of the secondary transmission timing group before modification, and in this case, the reconfiguration process when the timing reference cell is not changed (step S206 in FIG. 5) is applied. In addition, the target primary cell at this time may be a cell that has not been configured without limitation to the secondary cell.

At this time, the mobile-station apparatus 1 and the base-station apparatus 2 determine that the reference cell reconfiguration (step S104 in FIG. 3), the cell group reconfiguration (step S105 in FIG. 3), and the transmission timing timer reconfiguration (step S106 in FIG. 3) are necessary as the reconfiguration process when the timing reference cell is not changed (step S206 in FIG. 5).

A fourth case (FIG. 6(d)) is a case in which the target primary cell is a cell (the neighboring cell NC1 in FIG. 4) that constitutes a new secondary transmission timing group before modification, and in this case, the new cell group reconfiguration process (step S207 in FIG. 5) is applied.

At this time, the mobile-station apparatus 1 and the base-station apparatus 2 determine that the reference cell reconfiguration (step S104 in FIG. 3), the cell group reconfiguration (step S105 in FIG. 3), and the transmission timing timer reconfiguration (step S106 in FIG. 3) are necessary as the new cell group reconfiguration process (step S207 in FIG. 5).

Figure 7:
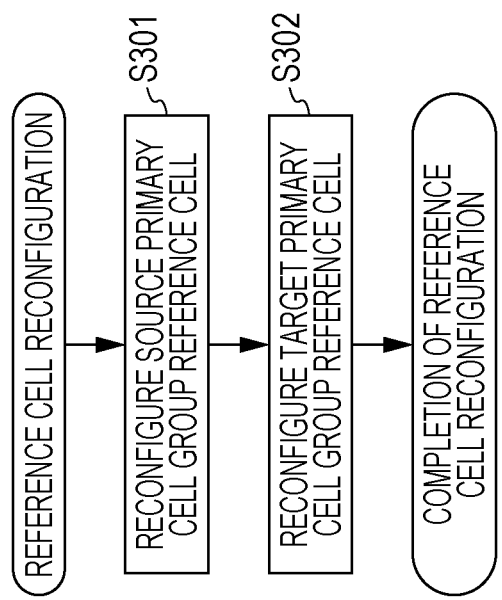
FIG. 7 is a flowchart illustrating reference cell reconfiguration in the first embodiment of the invention.

FIG. 7 is a flowchart illustrating a process flow of the reference cell reconfiguration in the respective cases. Methods of reconfiguring the reference cell in the above-described first to fourth cases will be described below, respectively.

The method of reconfiguring the reference cell of the first case will be described below.

In the first case, the mobile-station apparatus 1 and the base-station apparatus 2 reconfigure the source primary cell group reference cell (step S301). As a specific example, in the first case, the mobile-station apparatus 1 and the base-station apparatus 2 release a configuring of the timing reference cell with respect to the secondary cell that constitutes the primary transmission timing group before modification (transmission timing group 1). "Releasing of the configuration" includes meaning that the mobile-station apparatus 1 resets a current configuration, and returns the configuration of a not-configured state (default state), or meaning that a higher layer (RRC layer) of the mobile-station apparatus 1 retains a current configuration, but the configuration is not applied to a lower layer.

In addition, with respect to the secondary cell that constitutes the primary transmission timing group before modification (transmission timing group 1), the mobile-station apparatus 1 and the base-station apparatus 2 release a configuration of the path loss reference cell of the secondary cell in a case where the path loss reference cell of the secondary cell is the primary cell. The source primary cell group reference cell reconfiguration is automatically and implicitly performed from the current configuration by the mobile-station apparatus 1. That is, the source primary cell group reference cell reconfiguration may be performed without an explicit instruction from the base-station apparatus 2. In addition, the base-station apparatus 2 considers that the above-described mobile-station apparatus 1 automatically and implicitly reconfigures the source primary cell group reference cell from the current configuration, and thus it is possible to reduce control parameters necessary for the primary cell modification instruction message.

In addition, in the first case, the mobile-station apparatus 1 and the base-station apparatus 2 reconfigure a target primary cell group reference cell (step S302). As a specific example, in the first case, the mobile-station apparatus 1 and the base-station apparatus 2 reconfigure the configuration of the timing reference cell in order for the target primary cell to be a reference destination with respect to the secondary cell that constitutes the primary transmission timing group after modification (transmission timing group 1).

A timing at which the timing reference cell is reconfigured to the target primary cell may be time at which the mobile-station apparatus 1 performs the preliminary process of the primary cell reconfiguration other than a timing at which the mobile-station apparatus 1 performs the target primary cell group reference cell reconfiguration (step S302), and may be time at which the random access procedure according to the primary cell random access procedure is determined to succeed.

In addition, with respect to the secondary cell that constitutes the primary transmission timing group after modification (transmission timing group 1), the mobile-station apparatus 1 and the base-station apparatus 2 reconfigure the path loss reference cell of the secondary cell in order for the target primary cell to be a reference destination in a case where the path loss reference cell of the second cell is the primary cell. In addition, in a case where the path loss reference cell of the secondary cell has been configured to the secondary cell, reconfiguration of the path loss reference cell of the secondary cell is not necessary.

A timing at which the path loss reference cell is reconfigured to the target primary cell may be time at which the mobile-station apparatus 1 performs the preliminary process of the primary cell reconfiguration other than a timing at which the mobile-station apparatus 1 performs the target primary cell group reference cell reconfiguration (step S302), and may be time at which the random access procedure according to the primary cell random access procedure is determined to succeed. The target primary cell group reference cell reconfiguration is automatically and implicitly performed from the current configuration by the mobile-station apparatus 1. That is, the target primary cell group reference cell reconfiguration may be performed without an explicit instruction from the base-station apparatus 2. In addition, the base-station apparatus 2 regards that the mobile-station apparatus 1 automatically and implicitly reconfigures the target primary cell group reference cell from the current configuration, and thus it is possible to reduce control parameters necessary for the primary cell modification instruction message.

In the first case, the mobile-station apparatus 1 and the base-station apparatus 2 do not reconfigure the timing reference cell and the path loss reference cell with respect to the secondary cell of the secondary transmission timing group.

The method of reconfiguring the reference cell of the second case will be described below.

In the second case, the mobile-station apparatus 1 and the base-station apparatus 2 reconfigure the source primary cell group reference cell (step S301). As a specific example, in the second case, the mobile-station apparatus 1 and the base-station apparatus 2 release a configuration of the timing reference cell with respect to the secondary cell that constitutes the primary transmission timing group before modification (transmission timing group 1).

In addition, with respect to the secondary cell that constitutes the primary transmission timing group before modification (transmission timing group 1), the mobile-station apparatus 1 and the base-station apparatus 2 release the configuration in a case where the path loss reference cell is the primary cell. In addition, with respect to the secondary cell that constitutes the primary transmission timing group before modification (transmission timing group 1), the mobile-station apparatus 1 and the base-station apparatus 2 release the secondary cell in a case where the path loss reference cell of the secondary cell is the primary cell. In a case of performing the release of the configuration or the release of the secondary cell on the basis of the above-described reconfiguration process, the mobile-station apparatus 1 may notify the base-station apparatus 2 of the release.

The source primary cell group reference cell reconfiguration is automatically and implicitly performed from the current configuration by the mobile-station apparatus 1. That is, the source primary cell group reference cell reconfiguration may be performed without an explicit instruction from the base-station apparatus 2. In addition, the base-station apparatus 2 regards that the mobile-station apparatus 1 automatically and implicitly reconfigures the source primary cell group reference cell from the current configuration, and thus it is possible to reduce control parameters necessary for the primary cell modification instruction message.

In addition, in the second case, the mobile-station apparatus 1 and the base-station apparatus 2 reconfigure a target primary cell group reference cell (step S302). As a specific example, in the second case, the mobile-station apparatus 1 and the base-station apparatus 2 reconfigure the configuration of the timing reference cell in order for the target primary cell to be a reference destination with respect to the secondary cell that constitutes the primary transmission timing group after modification (transmission timing group 2). That is, the configuration of the timing reference cell of the secondary cell that constitutes the primary transmission timing group after modification (transmission timing group 2) is released at once, and then the configuration of the timing reference cell is reconfigured in order for the target primary cell to be a reference destination.

A timing at which the timing reference cell is reconfigured to the target primary cell may be time at which the mobile-station apparatus 1 performs the preliminary process of the primary cell reconfiguration other than a timing at which the mobile-station apparatus 1 performs the target primary cell group reference cell reconfiguration (step S302), and may be time at which the random access procedure according to the primary cell random access procedure is determined to succeed.

In addition, the mobile-station apparatus 1 and the base-station apparatus 2 may skip reconfiguration of the timing reference cell of the secondary cell that constitutes the primary transmission timing group after modification (transmission timing group 2) by using a configuration in which the target primary cell in the second case is the timing reference cell of the secondary transmission timing group.

Since the path loss reference cell of the secondary cell has been configured to the secondary cell, it is not necessary for the mobile-station apparatus 1 and the base-station apparatus 2 to reconfigure the path loss reference cell with respect to the secondary cell that constitutes the primary transmission timing group after modification (transmission timing group 2). The target primary cell group reference cell reconfiguration is automatically and implicitly performed from the current configuration by the mobile-station apparatus 1. That is, the target primary cell group reference cell reconfiguration may be performed without an explicit instruction from the base-station apparatus 2. In addition, the base-station apparatus 2 regards that the mobile-station apparatus 1 automatically and implicitly reconfigures the above-described target primary cell group reference cell from the current configuration, and thus it is possible to reduce control parameters necessary for the primary cell modification instruction message.

However, the base-station apparatus 2 may reconfigure the path loss reference cell of the secondary cell that constitutes the primary transmission timing group after modification (transmission timing group 2) from the secondary cell to the primary cell (that is, the target primary cell) by explicitly notifying parameters necessary for the reconfiguration with the primary cell modification instruction message. In this case, the mobile-station apparatus 1 reconfigures the path loss reference cell of the secondary cell on the basis of the instruction of the base-station apparatus 2.

In a case where two or more secondary transmission timing groups have been configured in the second case, the mobile-station apparatus 1 and the base-station apparatus 2 do not reconfigure the timing reference cell and the path loss reference cell with respect to a secondary cell of the secondary transmission timing group that is not an object of the above-described reconfiguration.

The method of reconfiguring the reference cell in the third case will be described below.

In the third case, the mobile-station apparatus 1 and the base-station apparatus 2 reconfigure the source primary cell group reference cell (step S301). The contents of the specific process that is performed in the source primary cell group reference cell reconfiguration are the same as the second case, and thus a detailed description thereof will be omitted.

In addition, in the third case, the mobile-station apparatus 1 and the base-station apparatus 2 reconfigure the target primary cell group reference cell (step S302). As a specific example, in the third case, with respect to the secondary cell that constitutes the primary transmission timing group after modification (transmission timing group 2), the mobile-station apparatus 1 and the base-station apparatus 2 reconfigure the configuration of the timing reference cell in order for the target primary cell to be a reference destination. That is, the configuration of the timing reference cell of the secondary cell that constitutes the primary transmission timing group after modification (transmission timing group 2) is released at once, and then the configuration of the timing reference cell is reconfigured in order for the target primary cell to be a reference destination.

A timing at which the timing reference cell is reconfigured to the target primary cell may be time at which the mobile-station apparatus 1 performs the preliminary process of the primary cell reconfiguration other than a timing at which the mobile-station apparatus 1 performs the target primary cell group reference cell reconfiguration (step S302), and may be time at which the random access procedure according to the primary cell random access procedure is determined to succeed.

Since the path loss reference cell of the secondary cell has been configured to the secondary cell, it is not necessary for the mobile-station apparatus 1 and the base-station apparatus 2 to reconfigure the path loss reference cell with respect to the secondary cell that constitutes the primary transmission timing group after modification (transmission timing group 2). The target primary cell group reference cell reconfiguration is automatically and implicitly performed from the current configuration by the mobile-station apparatus 1. That is, the target primary cell group reference cell reconfiguration may be performed without an explicit instruction from the base-station apparatus 2. In addition, the base-station apparatus 2 regards that the mobile-station apparatus 1 automatically and implicitly reconfigures the target primary cell group reference cell from the current configuration, and thus it is possible to reduce control parameters necessary for the primary cell modification instruction message.

However, the base-station apparatus 2 may reconfigure the path loss reference cell of the secondary cell that constitutes the primary transmission timing group after modification (transmission timing group 2) from the secondary cell to the primary cell (that is, the target primary cell) by explicitly notifying parameters necessary for the reconfiguration with the primary cell modification instruction message. In this case, the mobile-station apparatus 1 reconfigures the path loss reference cell of the secondary cell on the basis of the instruction of the base-station apparatus 2.

In a case where two or more secondary transmission timing groups have been configured in the third case, the mobile-station apparatus 1 and the base-station apparatus 2 do not reconfigure the timing reference cell and the path loss reference cell with respect to a secondary cell of the secondary transmission timing group that is not an object of the above-described reconfiguration.

The method of reconfiguring the reference cell in the fourth case will be described below.

In the fourth case, the mobile-station apparatus 1 and the base-station apparatus 2 reconfigure the source primary cell group reference cell (step S301). The contents of the specific process that is performed in the source primary cell group reference cell reconfiguration are the same as the second case, and thus a detailed description thereof will be omitted.

In addition, in the fourth case, since the secondary cell that constitutes the primary transmission timing group after modification (transmission timing group 3) is a cell that is newly added at all times, it is not necessary for the mobile-station apparatus 1 and the base-station apparatus 2 to perform the target primary cell group reference cell reconfiguration (step S302). That is, it is not necessary to reconfigure the timing reference cell and the path loss reference cell with respect to the secondary cell that constitutes the primary transmission timing group after modification (transmission timing group 3).

In the fourth case, the mobile-station apparatus 1 and the base-station apparatus 2 do not reconfigure the timing reference cell and the path loss reference cell with respect to the secondary cell of the secondary transmission timing group.

Figure 8:
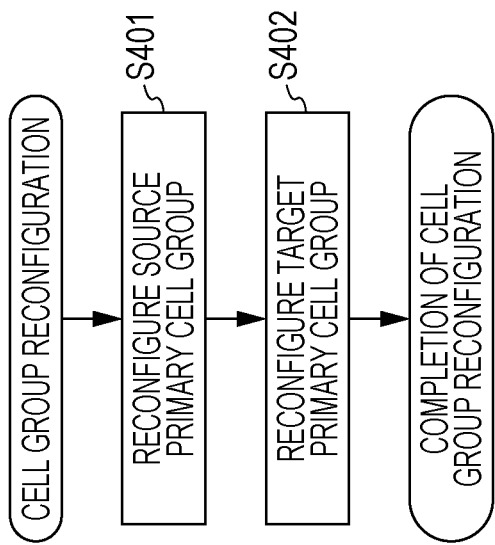
FIG. 8 is a flowchart illustrating group reconfiguration in the first embodiment of the invention.

FIG. 8 is a flowchart illustrating a process flow of the cell group reconfiguration in the respective cases. Hereinafter, methods of reconfiguring the cell group in the second to fourth cases will be described below, respectively. In addition, in the first case, a modification in the cell group, which accompanies the modification of the primary cell, does not occur, and thus it is not necessary for the mobile-station apparatus 1 and the base-station apparatus 2 to perform the cell group reconfiguration.

The method of reconfiguring the cell group in the second case will be described below.

In the second case, the mobile-station apparatus 1 and the base-station apparatus 2 reconfigure the source primary cell group (step S401). As a specific example, in the second case, the mobile-station apparatus 1 and the base-station apparatus 2 reconfigure a transmission timing group identifier (TAG1) that has been configured to the primary transmission timing group before modification (transmission timing group 1).

In addition, in the second case, the mobile-station apparatus 1 and the base-station apparatus 2 reconfigure target primary cell group (step S402). As a specific example, in the second case, the mobile-station apparatus 1 and the base-station apparatus 2 reconfigure a transmission timing group identifier (TAG2) that has been configured to the primary transmission timing group after modification (transmission timing group 2).

As a method of reconfiguring the source primary cell group and a method of reconfiguring the target primary cell group, which are performed by the mobile-station apparatus 1 and the base-station apparatus 2, the following methods may be considered. That is, (A) a method of switching a transmission timing group identifier of the primary transmission timing group before modification and a transmission timing group identifier of the primary transmission timing group after modification, (B) a method of newly configuring a transmission timing group identifier notified from the base-station apparatus 2, and (C) a method in which among serving cells that belong to the transmission timing group, the smallest cell index value is configured as the transmission timing group identifier.

The mobile-station apparatus 1 may use the methods (A) to (C) by switching these methods on the basis of an instruction from the base-station apparatus 2. For example, in a case where an instruction from the base-station apparatus 2 is not present, the mobile-station apparatus 1 employs the method (A) or the method (C), and may employ the method (B) in a case where the instruction is present. In addition, for example, after employing the method (A) or the method (C), the mobile-station apparatus 1 may also employ the method (B) in a case where the instruction from the base-station apparatus 2 is present.

In the case of the method (A), the mobile-station apparatus 1 and the base-station apparatus 2 switch the transmission timing group identifier of the primary transmission timing group before modification and the transmission timing group identifier of the primary transmission timing group after modification. For example, in a case where the transmission timing group identifier (TAG1) is configured to the primary transmission timing group before modification (transmission timing group 1), and the transmission timing group identifier (TAG2) is configured to the primary transmission timing group after modification (transmission timing group 2), the transmission timing group identifier of the transmission timing group 1 is reconfigured to TAG2 from TAG1, and the transmission timing group identifier of the transmission timing group 2 is reconfigured to TAG1 from TAG2.

The method (A) of reconfiguring the cell group is automatically and implicitly performed from a current configuration by the mobile-station apparatus 1. That is, this method may be performed without an explicit instruction from the base-station apparatus 2. In addition, the base-station apparatus 2 regards that the mobile-station apparatus 1 automatically and implicitly performs the method (A) of reconfiguring the cell group from the current configuration, and thus it is possible to reduce control parameters necessary for the primary cell modification instruction message.

In a case of the method (B), the base-station apparatus 2 notifies the mobile-station apparatus 1 of the transmission timing group identifier of the primary transmission timing group before modification, the primary transmission timing group after modification, or both of the primary transmission timing group before modification and the primary transmission timing group after modification. In a case where the transmission timing group identifier of the primary transmission timing group before modification is notified, the mobile-station apparatus 1 reconfigures the transmission timing group identifier of the primary transmission timing group before modification. In a case where the transmission timing group identifier of the primary transmission timing group after modification is notified, the mobile-station apparatus 1 reconfigures the transmission timing group identifier of the primary transmission timing group after modification.

For example, a new transmission timing group identifier (TAG3) is notified with respect to the transmission timing group identifier (TAG1) of the primary transmission timing group before modification (transmission timing group 1), the transmission timing group identifier of the transmission timing group 1 is reconfigured to TAG3 from TAG1. Similarly, in a case where a new transmission timing group identifier (TAG4) is notified with respect to the transmission timing group identifier (TAG2) of the primary transmission timing group after modification (transmission timing group 2), the transmission timing group identifier of the transmission timing group 2 is reconfigured to TAG4 from TAG2.

The mobile-station apparatus 1 performs the above-described cell group reconfiguration (modification) with respect to only the transmission timing group for which a new transmission timing group identifier is notified from the base-station apparatus 2. The mobile-station apparatus 1 may use the current transmission timing group identifier as is without performing reconfiguration (modification) of the transmission timing group identifier with respect to the transmission timing group for which a new transmission timing group identifier is not notified from the base-station apparatus 2. In addition, the mobile-station apparatus 1 and the base-station apparatus 2 may assume that reconfiguration (modification) of the transmission timing group identifier, which accompanies the modification of the primary cell, is not performed, and may regard that the current configuration is continuously used at all times.

In a case of the method (C), among serving cells that belong to the transmission timing group, the mobile-station apparatus 1 and the base-station apparatus 2 configure the smallest cell index value as the transmission timing group identifier. The serving cells may be in a deactivation state. For example, the following cell configuration may be considered. That is, the serving cells that constitute the primary transmission timing group before modification (transmission timing group 1) include a primary cell (cell index value: 0), a secondary cell 1 (cell index value: 2), and a secondary cell 2 (cell index value: 3), and the serving cells that constitute the primary transmission timing group after modification (transmission timing group 2) include a secondary cell 3 (cell index value: 1) and a secondary cell 4 (cell index value: 6).

In addition, it is assumed that the transmission timing group identifier of the transmission timing group 1 has been configured to TAG0 (zero), and the transmission timing group identifier of the transmission timing group 2 is configured to TAG1. At this time, in a case where the primary cell is changed and thus the target primary cell is the secondary cell 4, in the transmission timing group 1, the serving cell having the smallest cell index value is the secondary cell 1 (cell index value: 2), and thus the transmission timing group identifier of the transmission timing group 1 is reconfigured to TAG2 from TAG0. On the other hand, among the serving cells that constitute the primary transmission timing group after modification (transmission timing group 2), a serving cell having the smallest cell index value is the primary cell (cell index value: 0), and thus the transmission timing group identifier of the transmission timing group 2 is reconfigured to TAG0 from TAG1.

The method (C) of reconfiguring the cell group is automatically and implicitly performed from a current configuration by the mobile-station apparatus 1. That is, the method (C) may be performed without an explicit instruction from the base-station apparatus 2. In addition, the base-station apparatus 2 regards that the mobile-station apparatus 1 automatically and implicitly performs the method (C) of reconfiguring the cell group from the current configuration, and thus it is possible to reduce control parameters necessary for the primary cell modification instruction message. In addition, the cell index value that is used at this time may be the maximum cell index value among the serving cells that belong to the transmission timing group.

The method of reconfiguring the cell group in the third case will be described below.

In the third case, the mobile-station apparatus 1 and the base-station apparatus 2 perform the source primary cell group reconfiguration (step S401) and the target primary cell group reconfiguration (step S402), respectively. The contents of the specific processes that are performed in the source primary cell group reconfiguration and the target primary cell group reconfiguration are the same as the second case, and thus a detailed description thereof will be omitted.

The method of reconfiguring the cell group in the fourth case will be described below.

In the fourth case, the mobile-station apparatus 1 and the base-station apparatus 2 reconfigure the source primary cell group (step S401). As a specific example, in the fourth case, the mobile-station apparatus 1 and the base-station apparatus 2 reconfigure the transmission timing group identifier (TAG1) that has been configured to the primary transmission timing group before modification (transmission timing group 1).

In addition, in the fourth case, the mobile-station apparatus 1 and the base-station apparatus 2 reconfigure the target primary cell group (step S402). As a specific example, in the fourth case, the mobile-station apparatus 1 and the base-station apparatus 2 reconfigure a new transmission timing group identifier with respect to the primary transmission timing group after modification (transmission timing group 3).

As a method of reconfiguring the source primary cell group and the target primary cell group, (A) a method of switching a transmission timing group identifier of the primary transmission timing group before modification and a transmission timing group identifier of the primary transmission timing group after modification, (B) a method of newly configuring a transmission timing group identifier notified from the base-station apparatus 2, (C) a method in which among serving cells that belong to the transmission timing group, the smallest cell index value is configured as the transmission timing group identifier.

The mobile-station apparatus 1 may use the methods (A) to (C) by switching these methods on the basis of an instruction from the base-station apparatus 2. For example, in a case where an instruction from the base-station apparatus 2 is not present, the mobile-station apparatus 1 employs the method (A) or the method (C), and may employ the method (B) in a case where the instruction is present. In addition, for example, after employing the method (A) or the method (C), the mobile-station apparatus 1 may also employ the method (B) in a case where the instruction from the base-station apparatus 2 is present.

In a case of the method (A), reconfiguration of the transmission timing group identifier of the primary transmission timing group before modification is different from the second case. For example, in a case where the transmission timing group identifier (TAG1) is configured to the primary transmission timing group before modification (transmission timing group 1), the transmission timing group identifier of the primary transmission timing group after modification (transmission timing group 3) is reconfigured to TAG1. On the other hand, the transmission timing group 3 is a transmission timing group that is newly configured, and thus the transmission timing group 3 does not have the transmission timing group identifier before modification.

Therefore, in the fourth case, the mobile-station apparatus 1 and the base-station apparatus 2 reconfigure the transmission timing group identifier (TAG1) of the transmission timing group 1 by using any one of the following methods. As a method of reconfiguring the transmission timing group identifier of the primary transmission timing group before modification, the following methods may be considered. That is, (A1) a method of performing reconfiguration by selecting the smallest number value among transmission timing group identifiers that are not used yet, and (A2) a method of releasing the configuration of the transmission timing group identifier of the transmission timing group.

In a case of the method (A1), with respect to the transmission timing group identifier of the primary transmission timing group before modification, the mobile-station apparatus 1 and the base-station apparatus 2 perform reconfiguration by selecting the smallest number value among transmission timing group identifiers that are not used yet. For example, in a case where 0, 1, and 3 have been used as a transmission timing group identifier (TAG-ID) (that is, three different transmission timing groups (TAG0, TAG1, and TAG3) have been configured with respect to the mobile-station apparatus 1), the transmission timing group identifier that is reconfigured to the primary transmission timing group before modification (transmission timing group 1) becomes TAG2.

The method (A1) of reconfiguring the cell group is automatically and implicitly performed from a current configuration by the mobile-station apparatus 1. That is, this method may be performed without an explicit instruction from the base-station apparatus 2. In addition, the base-station apparatus 2 regards that the mobile-station apparatus 1 automatically and implicitly performs the method (A1) of reconfiguring the cell group from the current configuration, and thus it is possible to reduce control parameters necessary for the primary cell modification instruction message. In addition, the value of the transmission timing group identifier that is used at this time may be a value having the largest number among the largest transmission timing group identifiers that are not used.

In a case of the method (A2), with respect to the transmission timing group identifier of the primary transmission timing group before modification, the mobile-station apparatus 1 and the base-station apparatus 2 release the configuration of the transmission timing group identifier of the transmission timing group. For example, the transmission timing group identifier of the primary transmission timing group before modification (transmission timing group 1) is not configured. In addition, the transmission timing group identifier of the primary transmission timing group before modification (transmission timing group 1) is a default value. The mobile-station apparatus 1 and the base-station apparatus 2 may regard that a specific value (for example, TAG8), which represents that the transmission timing group identifier is not configured, may be reconfigured as the default value.

The method (A2) of reconfiguring the cell group is automatically and implicitly performed from the current configuration by the transmission timing group 1. That is, the method (A2) may be performed without an explicit instruction from the base-station apparatus 2. In addition, the base-station apparatus 2 regards that the mobile-station apparatus 1 automatically and implicitly performs the method (A2) of reconfiguring the cell group from the current configuration, and thus it is possible to reduce control parameters necessary for the primary cell modification instruction message.

In a case of the method (B), the contents of a specific process are the same as the method (B) of reconfiguring the cell group which is described in cell group reconfiguration method in the second case, and a detailed description thereof will omitted.

In a case of the method (C), the contents of a specific process are the same as the method (C) of reconfiguring the cell group which is described in cell group reconfiguration method in the second case, and a detailed description thereof will omitted.

Figure 9:
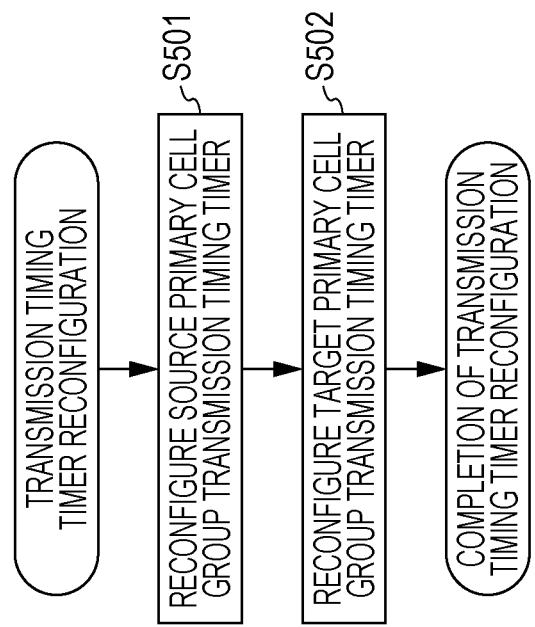
FIG. 9 is a flowchart illustrating transmission timing timer reconfiguration in the first embodiment of the invention.

FIG. 9 is a flowchart illustrating a process flow of the transmission timing timer reconfiguration in the respective cases. Hereinafter, methods of reconfiguring the cell group in the first to fourth cases will be described, respectively.

The method of reconfiguring the transmission timing timer in the first case will be described below.

In the first case, the mobile-station apparatus 1 and the base-station apparatus 2 reconfigure a source primary cell group transmission timing timer (step S501). As a specific example, in the first case, the mobile-station apparatus 1 and the base-station apparatus 2 reconfigure a transmission timing timer (transmission timing timer 1, TAT1) that has been configured in the primary transmission timing group before modification (transmission timing group 1).

The mobile-station apparatus 1 and the base-station apparatus 2 stop the transmission timing timer (transmission timing timer 1, TAT1) of the primary transmission timing group before modification (transmission timing group 1), or release the configuration of the transmission timing timer (transmission timing timer 1, TAT1). "Stopping of the transmission timing timer" includes meaning that the higher layer (RRC layer) of the mobile-station apparatus 1 retains the current configuration, but the transmission timing timer retains a current value and does not count, or meaning that the transmission timing timer is reset to return to a state before initiation of counting.

A timing at which the transmission timing timer of the primary transmission timing group before modification is reconfigured may be time at which the mobile-station apparatus 1 performs the preliminary process of the primary cell reconfiguration other than a timing at which the mobile-station apparatus 1 reconfigures the source primary cell group transmission timing timer (step S501), and may be time at which the random access procedure according to the primary cell random access procedure is determined to succeed. The source primary cell group transmission timing timer reconfiguration is automatically and implicitly performed from the current configuration by the mobile-station apparatus 1. That is, the source primary cell group transmission timing timer reconfiguration may be performed without an explicit instruction from the base-station apparatus 2. In addition, the base-station apparatus 2 regards that the mobile-station apparatus 1 automatically and implicitly reconfigures the source primary cell group transmission timing timer from the current configuration, and thus it is possible to reduce control parameters necessary for the primary cell modification instruction message.

In addition, in the first case, a modification in the cell group, which accompanies the modification of the primary cell, does not occur, and thus it is not necessary for the mobile-station apparatus 1 and the base-station apparatus 2 to perform target primary cell group transmission timing timer reconfiguration (step S502). In addition, in the first case, the mobile-station apparatus 1 and the base-station apparatus 2 do not reconfigure the transmission timing timer with respect to the secondary cell of the secondary transmission timing group.

The method of reconfiguring the transmission timing timer in the second case will be described below.

In the second case, the mobile-station apparatus 1 and the base-station apparatus 2 reconfigure the source primary cell group transmission timing timer (step S501). The contents of a specific process that is performed at the source primary cell group transmission timing timer reconfiguration are the same as the first case, and thus a detailed description thereof will be omitted.

In addition, in the second case, the mobile-station apparatus 1 and the base-station apparatus 2 reconfigure the target primary cell group transmission timing timer (step S502). As a specific example, in the second case, the mobile-station apparatus 1 and the base-station apparatus 2 reconfigure the transmission timing timer (transmission timing timer 2, TAT2) that has been configured to the primary transmission timing group after modification (transmission timing group 2).

The mobile-station apparatus 1 and the base-station apparatus 2 stop the transmission timing timer (transmission timing timer 2, TAT2) of the primary transmission timing group after modification (transmission timing group 2), or release the configuration of the transmission timing timer (transmission timing timer 2, TAT2). "Stopping of the transmission timing timer" includes meaning that the higher layer (RRC layer) of the mobile-station apparatus 1 retains the current configuration, but the transmission timing timer retains a current value and does not count, or meaning that the transmission timing timer is reset to return to a state before initiation of counting.

A timing at which the transmission timing timer of the primary transmission timing group after modification is reconfigured may be time at which the mobile-station apparatus 1 performs the preliminary process of the primary cell reconfiguration other than a timing at which the mobile-station apparatus 1 reconfigures the target primary cell group transmission timing timer (step S502), and may be time at which the random access procedure according to the primary cell random access procedure is determined to succeed.

The target primary cell group transmission timing timer reconfiguration is automatically and implicitly performed from the current configuration by the mobile-station apparatus 1. That is, the target primary cell group transmission timing timer reconfiguration may be performed without an explicit instruction from the base-station apparatus 2. In addition, the base-station apparatus 2 regards that the mobile-station apparatus 1 automatically and implicitly reconfigures the target primary cell group transmission timing timer from the current configuration, and thus it is possible to reduce control parameters necessary for the primary cell modification instruction message. That is, the base-station apparatus 2 can reduce control parameters necessary for the primary cell modification instruction message.

In a case where two or more secondary transmission timing groups have been configured in the second case, the mobile-station apparatus 1 and the base-station apparatus 2 do not reconfigure the transmission timing timer with respect to a secondary cell of the secondary transmission timing group that is not an object of the above-described reconfiguration.

The method of reconfiguring the transmission timing timer in the third case will be described below.

In the third case, the mobile-station apparatus 1 and the base-station apparatus 2 reconfigure the source primary cell group transmission timing timer (step S501) and reconfigure the target primary cell group transmission timing timer (step S502). The contents of a specific process that is performed at the source primary cell group transmission timing timer reconfiguration are the same as the first case, and thus a detailed description thereof will be omitted. In addition, the contents of a specific process that is performed at the target primary cell group transmission timing timer reconfiguration are the same as the second case, and thus a detailed description thereof will be omitted.

In a case where two or more secondary transmission timing groups have been configured in the third case, the mobile-station apparatus 1 and the base-station apparatus 2 do not reconfigure the transmission timing timer with respect to a secondary cell of the secondary transmission timing group that is not an object of the above-described reconfiguration.

The method of reconfiguring the transmission timing timer in the fourth case will be described below.

In the fourth case, the mobile-station apparatus 1 and the base-station apparatus 2 reconfigure the source primary cell group transmission timing timer (step S501). The contents of a specific process that is performed at the source primary cell group transmission timing timer reconfiguration are the same as the first case, and thus a detailed description thereof will be omitted.

In the fourth case, in the mobile-station apparatus 1 and the base-station apparatus 2, the transmission timing timer (transmission timing timer 3, TAT3) of the primary transmission timing group after modification (transmission timing group 3) is newly configured at all times, and thus the reconfiguration (step S502) of the target primary cell group transmission timing timer in the primary transmission timing group after modification (transmission timing group 3) is not necessary.

In addition, in the fourth case, the mobile-station apparatus 1 and the base-station apparatus 2 do not reconfigure the transmission timing timer with respect to the secondary cell of the secondary transmission timing group.

Returning to FIG. 3, the mobile-station apparatus 1 performs the primary cell random access procedure (step S107). With regard to the primary cell random procedure, the random access procedure is performed according to random access configuration information in the target primary cell that is instructed from the base-station apparatus 2. In a case where there random access procedure is the contention based random access procedure, the mobile-station apparatus 1 and the base-station apparatus 2 use a procedure in FIG. 16. On the other hand, in a case where the random access procedure is the non-contention based random access procedure, the mobile-station apparatus 1 and the base-station apparatus 2 use a procedure in FIG. 17. In addition, the mobile-station apparatus 1 in which the primary cell random access procedure is normally completed transmits an RRC message (primary cell modification completion message), which reports completion of primary cell modification instruction, to the base-station apparatus 2 (step S108).

As each control message in FIG. 3, an existing RRC message in EURTA may be used again. For example, as the primary cell modification instruction message and the primary cell modification completion message, an RRC connection reconfiguration message and an RRC connection reconfiguration complete message may be used again after adding necessary parameters to the messages, respectively.

As described above, according to the first embodiment, the mobile-station apparatus 1 and the base-station apparatus 2 can efficiently control the uplink transmission timing for each group of the uplink transmission timing.

In a case where a primary cell modification is instructed from the base-station apparatus 2, the mobile-station apparatus 1 according to this embodiment can efficiently reconfigure the reference cell of the serving cell in the primary transmission timing group before and after modification on the basis of the transmission timing group to which the target primary cell belongs. In addition, it is possible to efficiently reconfigure the transmission timing group identifier of the primary transmission timing group before modification and before modification on the basis of the transmission timing group to which the target primary cell belongs. In addition, it is possible to efficiently reconfigure the transmission timing timer relating to the primary transmission timing group before and after modification on the basis of the transmission timing group to which the target primary cell belongs.

As described above, the mobile-station apparatus 1 can efficiently reconfigure the reference cell, the transmission timing group identifier, and the transmission timing timer in the primary transmission timing group before and after modification, and thus control is simplified and use efficiency of the radio resources are improved.

In addition, in a case of giving an instruction for the mobile-station apparatus 1 to modification the primary cell, the base-station apparatus 2 of this embodiment can efficiently reconfigure the reference cell of the serving cell of the primary transmission group before and after modification for each mobile-station apparatus 1 on the basis of the transmission timing group to which the target primary cell belongs. In addition, the base-station apparatus 2 can efficiently reconfigure the transmission timing group identifier of the primary transmission timing group before and after modification on the basis of the transmission timing group to which the target primary cell belongs. In addition, the base-station apparatus 2 can efficiently reconfigure the transmission timing timer relating to the primary transmission timing group before and after modification on the basis of the transmission timing group to which the target primary cell belongs.

As described above, the base-station apparatus 2 can efficiently reconfigure the reference cell, the transmission timing group identifier, and the transmission timing timer in the primary transmission timing group before and after modification for each mobile-station apparatus 1, and control parameter necessary for the reconfiguration can be reduced. As a result, use efficiency of the radio resources is improved.

Second Embodiment

A second embodiment of the invention will be described below. In the first embodiment, a case of changing the primary cell of the mobile-station apparatus 1 is exemplified. However, in the second embodiment, a description will be given to a method for controlling uplink transmission in a case where the secondary cell that is a transmission timing reference cell is changed from another cell. The configurations of the mobile-station apparatus 1 and the base-station apparatus 2, which are used in this embodiment, are the same as FIGS. 1 and 2, and thus a description thereof will be omitted. In addition, as a network configuration of the communication system in which the mobile-station apparatus 1 and the base-station apparatus 2 are arranged, the same network configuration as FIG. 14 may be applied.

Figure 10:
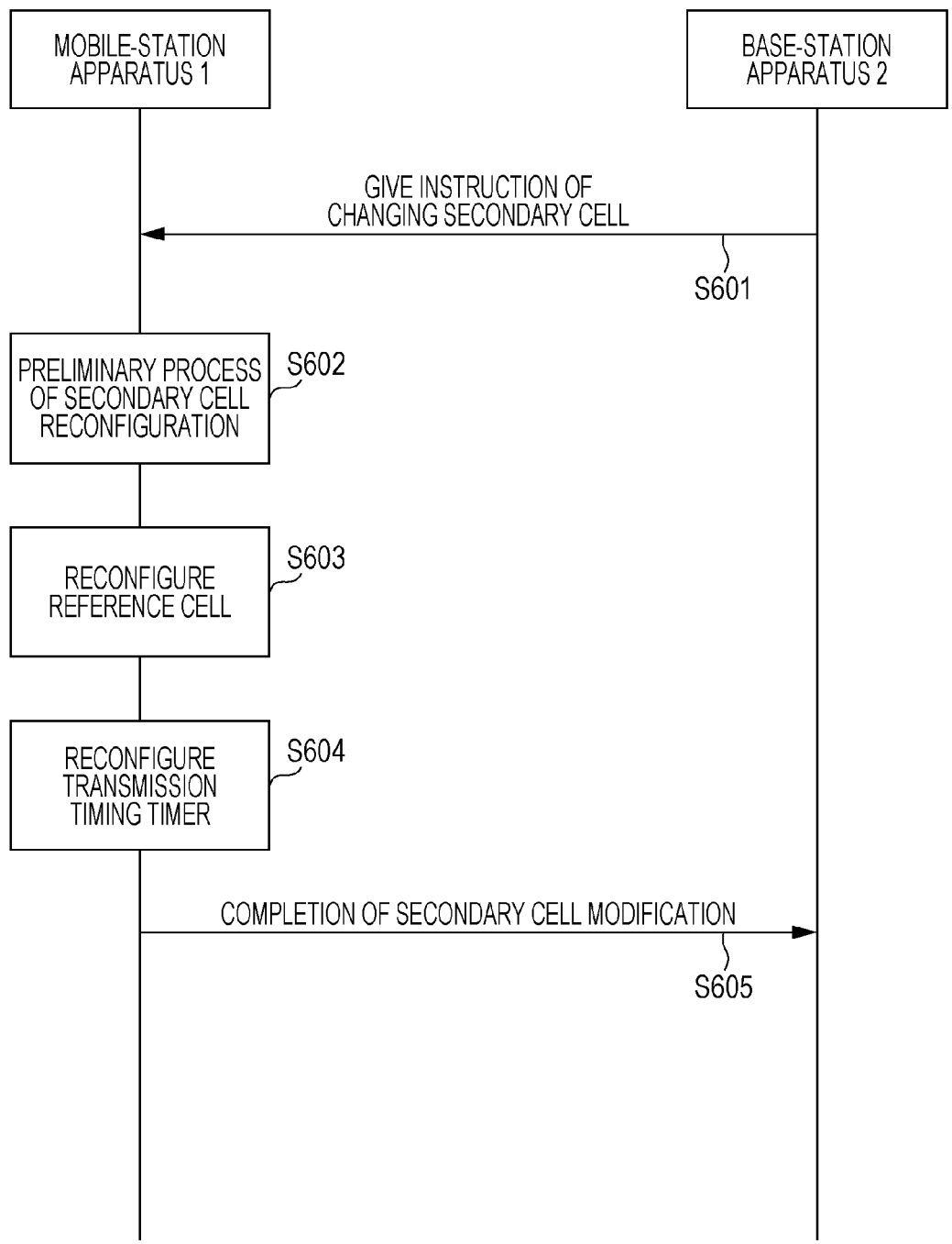
FIG. 10 is a sequence chart illustrating a secondary cell modification procedure in a second embodiment of the invention.

FIG. 10 is a procedure chart illustrating a primary cell modification procedure in the mobile-station apparatus 1 and the base-station apparatus 2 according to this embodiment. The mobile-station apparatus 1 of this sequence chart initiates an operation from a state (connected state) of being connected to the base-station apparatus 2 through at least the primary cell and one or more secondary cells in which the uplink transmission timing is different from that of the primary cell.

As an example of a carrier aggregation state of the mobile-station apparatus 1 and the base-station apparatus 2 when initiating the sequence chart in FIG. 10, the same state as that shown in FIG. 4 is used.

When determining that it is necessary to modification a cell currently operating as a secondary cell, the base-station apparatus 2 transmits a message (secondary cell modification instruction message) that instructs modification of the secondary cell to the mobile-station apparatus 1 (step S601). In a case where changing the secondary cell of the mobile-station apparatus 1, the base-station apparatus 2 may consider a report (measurement report) of measurement results, which is transmitted from the mobile-station apparatus 1, a load situation of each frequency, and whether or not MBMS is received.

The base-station apparatus 2 transmits the secondary cell modification instruction message in combination with secondary cell configuration modification information included in the message to the mobile-station apparatus 1. The secondary cell configuration modification information is information that instructs addition, deletion, and configuration modification (reconfiguration) of the secondary cell. The mobile-station apparatus 1, which receives the secondary cell modification instruction message, performs a preliminary process of secondary cell reconfiguration to determine a secondary cell (target secondary cell) that is an object of configuration modification, and a necessary control content (process) (step S602).

In addition, the mobile-station apparatus 1 selects a necessary control content between step S603 and step S604 in accordance with the control contents (process) determined in step S602, and performs the process. The process in step S603 and step S604 may be performed in an arbitrary procedure instead of the procedure shown in FIG. 10.

In step S603, the mobile-station apparatus 1 performs a reconfiguration process of reconfiguring a reference cell in a transmission timing group (target secondary cell group) to which the target secondary cell belongs as necessary.

In addition, in step S604, the mobile-station apparatus 1 performs a process of reconfiguring the transmission timing timer in the transmission timing group (target secondary cell group) to which the target secondary cell belongs.

Figure 11:
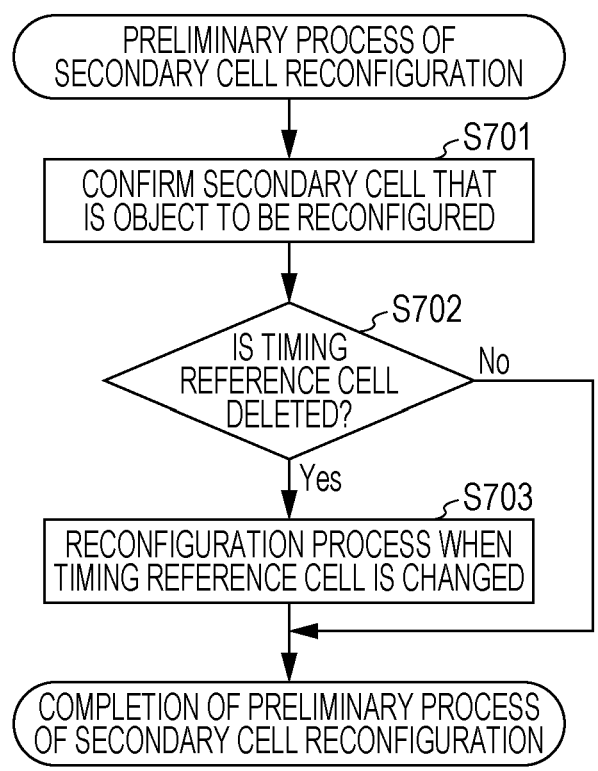
FIG. 11 is a flowchart illustrating a preliminary process of secondary cell reconfiguration in the second embodiment of the invention.

FIG. 11 is a flowchart illustrating details of a process flow of the preliminary process of the secondary cell reconfiguration in step S602. In step S701, the mobile-station apparatus 1 determines that the target secondary cell for which reconfiguration is instructed is which cell from cell information (cell index, and the like) of the secondary cell modification instruction message.

In step S701, the mobile-station apparatus 1 confirms whether or not the target secondary cell designated with the secondary cell modification instruction message is a timing reference cell of the target secondary cell group, and whether or not deletion of the secondary cell is instructed. In addition, in step S702, the mobile-station apparatus 1 determines a necessary control procedure on the basis of the determination whether or not the timing reference cell confirmed in step S701. "Deletion of the secondary cell" has meaning that the mobile-station apparatus 1 and the base-station apparatus 2 release the configuration relating to the secondary cell, and change the configuration to a state in which the carrier aggregation using the secondary cell is not performed.

In a case where the target secondary cell is the timing reference cell of the target secondary cell group and deletion of the secondary cell is instructed (for example, in a case where deletion of the secondary cell SC2 in FIG. 4 is instructed), the mobile-station apparatus 1 determines that a reconfiguration process when the timing reference cell is changed (step S703) is necessary. On the other hand, in a case where the target secondary cell is not the timing reference cell of the target secondary cell group to which the target secondary cell belongs (for example, deletion of the secondary cell SC1 and the secondary cell SC3 in FIG. 4 is instructed), or in a case where the target secondary cell is the timing reference cell of the target secondary cell group, but deletion of the secondary cell is not instructed (for example, a case where modification of the secondary cell SC2 in FIG. 4 is instructed, and the like), the mobile-station apparatus 1 determines that special control accompanying the modification of the target cell is not necessary. In addition, after determining the reconfiguration process that is necessary, the mobile-station apparatus 1 completes the preliminary process of the secondary cell reconfiguration.

At this time, as a reconfiguration process when the timing reference cell is changed (step S703), the mobile-station apparatus 1 and the base-station apparatus 2 determine that the reference cell reconfiguration (step S603) and the transmission timing timer reconfiguration (step S604) are necessary.

Figure 12:
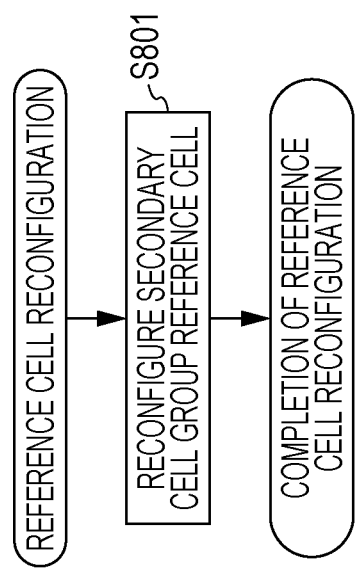
FIG. 12 is a flowchart illustrating reference cell reconfiguration in the second embodiment of the invention.

FIG. 12 is a flowchart illustrating a process flow of the reference cell reconfiguration in a case where the reconfiguration process when the timing reference cell is changed is necessary.

The mobile-station apparatus 1 and the base-station apparatus 2 reconfigure secondary cell group reference cell (step S801). As a specific example, the mobile-station apparatus 1 and the base-station apparatus 2 release the configuration of the timing reference cell with respect to all remaining secondary cells (in an example in FIG. 4, the secondary cell SC3 of the transmission timing group 2) that constitute the secondary transmission timing group in which the reference cell is deleted. "Releasing of the configuration" includes meaning that the mobile-station apparatus 1 resets a current configuration, and returns the configuration to a not-configured state (default state), or meaning that a higher layer (RRC layer) of the mobile-station apparatus 1 retains a current configuration, but the configuration is not applied to a lower layer.

In addition, with respect to all remaining secondary cells that constitute the secondary transmission timing group in which the reference cell is deleted, the mobile-station apparatus 1 and the base-station apparatus 2 release the secondary cells. In addition, in a case of performing release of the configuration or release of the secondary cell on the basis of the above-described reconfiguration process, the mobile-station apparatus 1 may notify the base-station apparatus 2 of the release. In addition, with respect to all remaining secondary cells that constitute the secondary transmission timing group in which the reference cell is deleted, the mobile-station apparatus 1 and the base-station apparatus 2 change the secondary cells to a deactivation state.

A timing at which the timing reference cell is reconfigured may be time at which the mobile-station apparatus 1 performs the preliminary process of the secondary cell reconfiguration other than a timing at which the mobile-station apparatus 1 reconfigures the secondary cell group reference cell (step S801). The secondary cell group reference cell reconfiguration is automatically and implicitly performed from the current configuration by the mobile-station apparatus 1. That is, the secondary cell group reference cell reconfiguration may be performed without an explicit instruction from the base-station apparatus 2. In addition, the base-station apparatus 2 regards that the mobile-station apparatus 1 automatically and implicitly reconfigures the secondary cell group reference cell from the current configuration, and thus it is possible to reduce control parameters necessary for the secondary cell modification instruction message.

Figure 13:
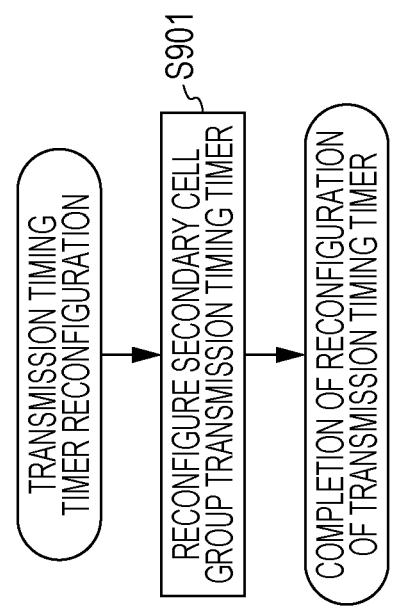
FIG. 13 is a flowchart illustrating transmission timing timer reconfiguration in the second embodiment of the invention.

FIG. 13 is a flowchart illustrating a process flow of the transmission timing timer reconfiguration in a case where the reconfiguration process when the timing reference cell is changed is necessary.

The mobile-station apparatus 1 and the base-station apparatus 2 reconfigure the secondary cell group transmission timing timer (step S901). As a specific example, the mobile-station apparatus 1 and the base-station apparatus 2 stop a transmission timing timer (transmission timing timer 2, TAT2) of the secondary transmission timing group (transmission timing group 2) in which the reference cell is deleted, or release a configuration of the transmission timing timer (transmission timing timer 2, TAT2). "Stopping of the transmission timing timer" includes meaning that the higher layer (RRC layer) of the mobile-station apparatus 1 retains the current configuration, but the transmission timing timer retains a current value and does not count, or meaning that the transmission timing timer is reset to return to a state before initiation of counting.

A timing at which the transmission timing timer of the secondary transmission timing group after modification is reconfigured may be time at which the mobile-station apparatus 1 performs the preliminary process of the secondary cell reconfiguration other than a timing at which the mobile-station apparatus 1 performs the secondary cell group transmission timing timer (step S901).

The secondary cell group transmission timing timer reconfiguration is automatically and implicitly performed from the current configuration by the mobile-station apparatus 1. That is, the secondary cell group transmission timing timer reconfiguration may be performed without an explicit instruction from the base-station apparatus 2. In addition, the base-station apparatus 2 regards that the mobile-station apparatus 1 automatically and implicitly reconfigures the secondary cell group transmission timing timer from the current configuration, and thus it is possible to reduce control parameters necessary for the secondary cell modification instruction message.

In addition, the mobile-station apparatus 1 may perform only the transmission timing timer reconfiguration, and may not perform the secondary cell group reference cell reconfiguration.

As each control message in FIG. 10, an existing RRC message in EURTA may be used again. For example, as the secondary cell modification instruction message and the secondary cell modification completion message, an RRC connection reconfiguration message and an RRC connection reconfiguration complete message may be used again after adding necessary parameters to the messages, respectively.

As described above, according to the second embodiment, the mobile-station apparatus 1 and the base-station apparatus 2 can efficiently control the uplink transmission timing for each group of the uplink transmission timing, and thus it is possible to solve the problem in which the radio resource management relating to the uplink transmission control is not efficient.

In a case where deletion of the secondary cell is instructed from the base-station apparatus 2 as reconfiguration of the secondary cell, the mobile-station apparatus 1 according to this embodiment can efficiently reconfigure the reference cell of all remaining secondary cells of the secondary transmission timing group on the basis of determination of whether or not the target secondary cell is the reference cell of the secondary transmission timing group. In addition, it is possible to efficiently reconfigure the transmission timing timer of the secondary transmission timing group on the basis of the transmission timing group to which the target secondary cell belongs.

As described above, the mobile-station apparatus 1 can efficiently reconfigure the reference cell and the transmission timing timer in the secondary transmission timing group, and thus control is simplified and use efficiency of the radio resources are improved.

In addition, when the base-station apparatus 2 of this embodiment instructs the mobile-station apparatus 1 to delete the secondary cell as a modification of the secondary cell, it is possible to efficiently reconfigure the reference cell of all remaining secondary cells of the secondary transmission timing group on the basis of determination of whether or not the target secondary cell is the reference cell of the secondary transmission timing group. In addition, it is possible to efficiently reconfigure the transmission timing timer of the secondary transmission timing group on the basis of the transmission timing group to which the target secondary cell belongs.

As described above, the base-station apparatus 2 can efficiently reconfigure the reference cell and the transmission timing timer in the secondary transmission timing group for each mobile-station apparatus 1, and it is possible to reduce control parameters necessary for reconfiguration, and thus use efficiency of the radio resources are improved.

In addition, the above-described embodiments are illustrative only, and the invention may be realized by using various modifications and substituent examples. For example, the uplink transmission method may be applied to an arbitrary communication system of an FDD (frequency division duplex) method and a TDD (time division duplex) method. In addition, measurement values of the downlink component carrier may be used instead of the path loss or the other measurement values (SIR, SINR, RSRP, RSRQ, RSSI, and BLER), and a plurality of these measurement values may also be used in combination. In addition, respective parameter names described in the embodiments are given for convenience explanation, and even when parameter names in practical use and parameter names of this specification are different from each other, this difference does not have an effect on the gist of the invention which is claimed by this specification.

In addition, the mobile-station apparatus 1 is not limited to a mobile terminal, and the embodiments of the invention may be realized by a configuration in which the function of the mobile-station apparatus 1 is implemented in a fixed terminal, and the like. The mobile-station apparatus is also referred to as a user terminal, a terminal apparatus, a communication terminal, a mobile apparatus, UE (User Equipment), MS (mobile station). The base-station apparatus is also referred to as a radio base-station apparatus, a base station, a radio base station, a fixed station, NB (Node-B), eNB (evolved Node-B), BTS (Base Transceiver Station), and BS (Base Station).

In addition, for convenience of explanation, the mobile-station apparatus 1 and the base-station apparatus 2 of the embodiments are described with reference to functional block diagrams. However, the methods or steps of algorithm for realizing the function of each portion of the mobile-station apparatus 1 and the base-station apparatus 2, or a part of the function may be directly specified by hardware and a software module executed by a processor, or a combination of two of these. In a case where the function is implemented by software, the function is retained or transmitted as one or more commands or codes on a computer-readable recording medium. The computer-readable recording medium includes both of a communication medium including a medium that assists portability of a computer program from an arbitrary site to another site, and a computer recording medium.

In addition, the control of the mobile-station apparatus 1 or the base-station apparatus 2 may be performed by recording one or more commands or codes on the computer-readable recording medium and by allowing the one or more commands or codes that are recorded on the recording medium to be read by a computer system for execution. In addition, it is assumed that the "computer system" stated here includes OS or hardware such as peripherals.

The operation described in the respective embodiment of the invention may be realized by a program. A program that operates in the mobile-station apparatus 1 and the base-station apparatus 2 according to the respective embodiments of the invention is a program (program allowing a computer to operate) that controls CPU and the like to realize the function of the respective embodiments of the invention. In addition, the information that is dealt with these apparatuses is temporarily accumulated in RAM during processing, and is stored in various kinds of ROM or HDD. The information is read out by CPU as necessary, and correction and writing-in are performed. In addition, the function of the embodiments is realized by executing the program, and the function of the respective embodiments of the invention may be realized by processing in combination with an operating system, other application programs, and the like on the basis of an instruction of the program.

In addition, the "computer-readable recording medium" means a portable medium such as a semiconductor medium (for example, RAM, a non-volatile memory card, and the like), an optical recording medium (for example, DVD, MO, MD, CD, BD, and the like), and a magnetic recording medium (for example, a magnetic tape, flexible disk, and the like), and a storage apparatus such as a disk unit that is embedded in a computer system. In addition, it is assumed that the "computer-readable recording medium" includes dynamic retention of a program for a short time similar to a communication line in a case of transmitting a program over a communication line, for example, a network such as Internet or a communication line such as a telephone line, and retention of the program for a predetermined time similar to a volatile memory inside a computer system that becomes a server or a client in the case of the dynamic retention.

In addition, the program may be configured to realize a part of the above-described function, or may be configured to realize the above-described function in a combination with a program that is already recorded in a computer system.

In addition, the respective functional blocks or characteristics of the mobile-station apparatus 1 and the base-station apparatus 2 that are used in the respective embodiments may be implemented or executed by a general-purpose processor, a digital signal processor (DSP), an application-specific integrated circuit (ASIC), and a field programmable gate array signal (FPGA) which are designed to execute the above-described function, other programmable logic apparatuses, discrete gates or transistor logics, discrete hardware components, or a combination of these. As the general-purpose processor, a microprocessor is possible, but this processor may be a processor, a controller, a micro controller, or a state machine of an existing type.

The processor may be mounted as a combination of a computing apparatus. For example, a combination of a configuration of a DSP and a microprocessor, a plurality of microprocessors, one or more of a microprocessor connected to a DSP core, or other configurations may be mounted.

(1) A mobile-station apparatus according to embodiments of the invention is a mobile-station apparatus that is connected to a base-station apparatus by aggregating a plurality of cells, and is characterized in that cells of different frequencies are grouped on the basis of an instruction from the base-station apparatus, a timing reference cell that is used as a reference of an uplink transmission timing of the cells in the group, a group identifier that identifies the group, and a transmission timing timer that indicates available time of the uplink transmission timing of the cells in the group are configured for each group, and in a case of receiving a modification instruction message for the timing reference cell, one or more of a timing reference cell, a group identifier, and a transmission timing timer in respective groups to which the timing reference cell before and after modification belongs are reconfigured on the basis of current configuration content and cell information that designates the timing reference cell after modification.

(2) In addition, the mobile-station apparatus according to the embodiments of the invention is characterized in that the timing reference cell is a primary cell that is selected from the cells, and the modification instruction message for the timing reference cell is a primary cell modification instruction message.

(3) In addition, the mobile-station apparatus according to the embodiments of the invention is characterized in that the timing reference cell is a secondary cell that is selected for each cell group constituted by cells having the same uplink transmission timing, and the modification instruction message for the timing reference cell is a secondary cell modification instruction message.

(4) In addition, the mobile-station apparatus according to the embodiments of the invention is characterized in that a configuration of a timing reference cell of a first group to which the timing reference cell before modification belongs is released, and a timing reference cell of a second group to which the timing reference cell after modification belongs is reconfigured for the timing reference cell after modification.

(5) In addition, the mobile-station apparatus according to the embodiments of the invention is characterized in that a group identifier of a first group to which the timing reference cell before modification belongs and a group identifier of a second group to which the timing reference cell after modification belongs are replaced with each other.

(6) In addition, the mobile-station apparatus according to the embodiments of the invention is characterized in that each of a group identifier of a first group to which the timing reference cell before modification belongs and a group identifier of a second group to which the timing reference cell after modification belongs is reconfigured on the basis of a cell index of cells that belong to each of the groups.

(7) In addition, the mobile-station apparatus according to the embodiments of the invention is characterized in that a transmission timing timer of a first group to which the timing reference cell before modification belongs, and a transmission timing timer of a second group to which the timing reference cell after modification belongs are stopped, respectively.

(8) In addition, a base-station apparatus according to the embodiments of the invention is a base-station apparatus that is connected to a mobile-station apparatus by aggregating a plurality of cells, and is characterized in that an instruction of grouping cells of different frequencies is given to the mobile-station apparatus, a timing reference cell that is used as a reference of an uplink transmission timing of the cells in the group, a group identifier that identifies the group, and a transmission timing timer that indicates available time of the uplink transmission timing of the cells in the group, are configured for each group, and a modification instruction message for the timing reference cell is transmitted to the mobile-station apparatus in order for the mobile-station apparatus to reconfigure one or more of a timing reference cell, a group identifier, and a transmission timing timer in respective groups of the mobile-station apparatus to which the timing reference cell before and after modification belongs on the basis of a current configuration content of the mobile-station apparatus and cell information that designates the timing reference cell after modification in the mobile-station apparatus.

(9) In addition, the base-station apparatus according to the embodiments of the invention is characterized in that the timing reference cell is a primary cell that is selected from the cells, and the modification instruction message for the timing reference cell is a primary cell modification instruction message.

(10) In addition, the base-station apparatus according to the embodiments of the invention is characterized in that the timing reference cell is a secondary cell that is selected for each group constituted by cells having the same uplink transmission timing, and the modification instruction message for the timing reference cell is a secondary cell modification instruction message.

(11) In addition, the base-station apparatus according to the embodiments of the invention is characterized in that the base-station apparatus allows the mobile-station apparatus to release a configuration of a timing reference cell of a first group to which the timing reference cell before modification belongs, and to reconfigure a timing reference cell of a second group to which the timing reference cell after modification belongs for the timing reference cell after modification.

(12) In addition, the base-station apparatus according to the embodiments of the invention is characterized in that the base-station apparatus allows the mobile-station apparatus to replace a group identifier of a first group to which the timing reference cell before modification belongs and a group identifier of a second group to which the timing reference cell after modification belongs with each other.

(13) In addition, the base-station apparatus according to the embodiments of the invention is characterized in that the base-station apparatus allows the mobile-station apparatus to reconfigure each of a group identifier of a first group to which the timing reference cell before modification belongs and a group identifier of a second group to which the timing reference cell after modification belongs on the basis of a cell index of cells that belong to each of the groups.

(14) In addition, the base-station apparatus according to the embodiments of the invention is characterized in that the base-station apparatus allows the mobile-station apparatus to stop a transmission timing timer of a first group to which the timing reference cell before modification belongs, and a transmission timing timer of a second group to which the timing reference cell after modification belongs, respectively.

(15) In addition, a communication system according to the embodiments of the invention is a communication system in which a base-station apparatus and a mobile-station apparatus are connected to each other by aggregating a plurality of cells, and is characterized in that the base-station apparatus allows the mobile-station apparatus to group cells of different frequencies, configures a timing reference cell that is used as a reference of an uplink transmission timing of the cells in the group, a group identifier that identifies the group, and a transmission timing timer that indicates available time of the uplink transmission timing of the cells in the group for each group, and transmits a modification instruction message to the mobile-station apparatus in a case of changing the timing reference cell of the mobile-station apparatus; and in a case of receiving the modification instruction message for the timing reference cell from the base-station apparatus, the mobile-station apparatus reconfigures one or more of a timing reference cell, a group identifier, and a transmission timing timer in respective groups to which the timing reference cell before and after modification belongs on the basis of a current configuration content and cell information that designates the timing reference cell after modification.

(16) A method for controlling uplink transmission of a mobile-station apparatus according to the embodiments of the invention is a method for controlling uplink transmission of a mobile-station apparatus that is connected to a base-station apparatus by aggregating a plurality of cells, and is characterized in that the method includes a step of grouping cells of different frequencies on the basis of an instruction from the base-station apparatus, a step of configuring a timing reference cell that is used as a reference of an uplink transmission timing of the cells in the group, a group identifier that identifies the group, and a transmission timing timer that indicates available time of the uplink transmission timing of the cells in the group for each group, a step of receiving a modification instruction message for the timing reference cell, and a step of reconfiguring one or more of a timing reference cell, a group identifier, and a transmission timing timer in respective groups to which the timing reference cell before and after modification belongs on the basis of a current configuration content and cell information that designates the timing reference cell after modification.

(17) A method for controlling uplink transmission of a base-station apparatus according to embodiments of the invention is a method for controlling uplink transmission of a base-station apparatus that is connected to a mobile-station apparatus by aggregating a plurality of cells, and is characterized in that the method includes a step of giving an instruction for the mobile-station apparatus to group cells of different frequencies, a step of configuring a timing reference cell that is used as a reference of an uplink transmission timing of the cells in the group, a group identifier that identifies the group, and a transmission timing timer that indicates available time of the uplink transmission timing of the cells in the group for each group, a step of transmitting a modification instruction message for the timing reference cell, a step of allowing the mobile-station apparatus to reconfigure one or more of a timing reference cell, a group identifier, and a transmission timing timer in respective groups of the mobile-station apparatus to which the timing reference cell before and after modification belongs on the basis of a current configuration content of the mobile-station apparatus and cell information that designates the timing reference cell after modification in the mobile-station apparatus.

(18) An integrated circuit that is installed in a mobile-station apparatus according to the embodiments of the invention is an integrated circuit that is installed in a mobile-station apparatus configured to be connected to a base-station apparatus by aggregating a plurality of cells, and is characterized in that the integrated circuit groups cells of different frequencies on the basis of an instruction from the base-station apparatus, configures a timing reference cell that is used as a reference of an uplink transmission timing of the cells in the group, a group identifier that identifies the group, and a transmission timing timer that indicates available time of the uplink transmission timing of the cells in the group for each group, and reconfigures one or more of a timing reference cell, a group identifier, and a transmission timing timer in respective groups to which the timing reference cell before and after modification belongs on the basis of a current configuration content and cell information that designates the timing reference cell after modification in a case of receiving a modification instruction message for the timing reference cell.

(19) In addition, an integrated circuit that is installed in a base-station apparatus in the embodiments of the invention is an integrated circuit that is installed in a base-station apparatus configured to be connected to a mobile-station apparatus by aggregating a plurality of cells, and is characterized in that the integrated circuit gives an instruction for the mobile-station apparatus to group cells of different frequencies, configures a timing reference cell that is used as a reference of an uplink transmission timing of the cells in the group, a group identifier that identifies the group, and a transmission timing timer that indicates available time of the uplink transmission timing of the cells in the group for each group, and transmits a modification instruction message for the timing reference cell to the mobile-station apparatus in order for the mobile-station apparatus to reconfigure one or more of a timing reference cell, a group identifier, and a transmission timing timer in respective groups of the mobile-station apparatus to which the timing reference cell before and after modification belongs on the basis of current configuration content of the mobile-station apparatus and cell information that designates the timing reference cell after modification in the mobile-station apparatus.

Hereinbefore, the embodiments of the invention have been described in detail with reference to specific examples, but it is apparent that the gist of the respective embodiments and claims of the invention are not limited to the specific examples. That is, the description of this specification is illustrative only, and any limitation is not applied to the respective embodiments of the invention.

REFERENCE SIGNS LIST

1: Mobile-station apparatus
2: Base-station apparatus
11 to 13: Transmission apparatus
21 to 23: Reception apparatus
101, 201: Reception unit
102, 202: Demodulation unit
103, 203: Decoding unit
104: Measurement processing unit
105, 204: Control unit
106: Random access control unit
107, 205: Coding unit
108, 206: Modulation unit
109, 207: Transmission unit
110: Timing management unit
111, 208: Higher layer
209: Network signal transmission and reception unit

The invention claimed is:

1. A terminal apparatus that communicates with a base station apparatus by aggregating a plurality of cells, comprising:
a control unit configured to:
configure an uplink transmission timing group to which the cells belong, on the basis of a configuration of a transmission timing group which includes a group identifier that identifies the uplink transmission timing group to which the cells belong and a transmission timing timer which indicates available time of an uplink transmission timing of the cells in the group, and
release the configuration of the transmission timing group corresponding to the group, in a case where a timing reference cell used as a reference of the uplink transmission timing does not exist in the group due to a modification of a cell configuration on the basis of a modification instruction message, wherein the modification instruction message is transmitted from the base station apparatus and indicates an instruction of modification of the cells in the group.

2. The terminal apparatus according to claim 1, wherein the timing reference cell is a primary cell, and the modification instruction message is a message that instructs hand-over of the primary cell.

3. The terminal apparatus according to claim 1, wherein the timing reference cell is a secondary cell in a cell group constituted by cells having the same uplink transmission timing, and the modification instruction message is a message that instructs release of the secondary cell.

4. A base station apparatus that communicates with a terminal apparatus by aggregating a plurality of cells, comprising:
a control unit configured to:
transmit, in a case of giving an instruction of an uplink transmission timing group to which the cells belong, a configuration of a transmission timing group which includes a group identifier that identifies the uplink transmission timing group and a transmission timing timer which indicates available time of an uplink transmission timing of the cells in the group, to the terminal apparatus, and
release the configuration of the transmission timing group corresponding to the group, in a case where a timing reference cell used as a reference of the uplink transmission timing does not exist in the group due to a modification of a cell configuration by the terminal apparatus on the basis of a modification instruction message which indicates an instruction of modification of the cells in the group.

5. The base station apparatus according to claim 4, wherein the timing reference cell is a primary cell, and the modification instruction message is a message that instructs hand-over of the primary cell.

6. The base station apparatus according to claim 4, wherein the timing reference cell is a secondary cell in a cell group constituted by cells having the same uplink transmission timing, and the modification instruction message is a message that instructs release of the secondary cell.

7. A communication method of a terminal apparatus that communicates with a base station apparatus by aggregating a plurality of cells, comprising:
a step of configuring an uplink transmission timing group to which the cells belong, on the basis of a configuration of a transmission timing group which includes a group identifier that identifies the uplink transmission timing group to which the cells belong and a transmission timing timer that indicates available time of an uplink transmission timing of the cells in the group; and
a step of releasing the configuration of the transmission timing group corresponding to the group, in a case where a timing reference cell used as a reference of the uplink transmission timing does not exist in the group due to a modification of a cell configuration on the basis of a modification instruction message, wherein the modification instruction message is transmitted from the base station apparatus and indicates an instruction of modification of the cells in the group.

8. A communication method of a base station apparatus that communicates with a terminal apparatus by aggregating a plurality of cells, comprising:
a step of transmitting, in a case of giving an instruction of an uplink transmission timing group to which the cells belong, a configuration of a transmission timing group which includes a group identifier that identifies the uplink transmission timing group and a transmission timing timer which indicates available time of an uplink transmission timing of the cells in the group, to the terminal apparatus; and
a step of releasing the configuration of the transmission timing group corresponding to the group, in a case where a timing reference cell used as a reference of the uplink transmission timing does not exist in the group due to a modification of a cell configuration by the terminal apparatus on the basis of a modification instruction message which indicates an instruction of modification of the cells in the group.

* * * * *